United States Patent [19]
Braunberger et al.

[11] 3,914,926
[45] Oct. 28, 1975

[54] ROTARY BALING MACHINE

[75] Inventors: Benjamin A. Braunberger; Darwin M. Hanson, both of West Bend, Wis.

[73] Assignee: Gehl Company, West Bend, Wis.

[22] Filed: May 22, 1974

[21] Appl. No.: 472,081

[52] U.S. Cl. ............... 56/341; 198/204; 214/83.36
[51] Int. Cl.² .......................................... A01D 39/00
[58] Field of Search ........ 56/341, 342, 343; 100/88; 214/83.26, 83.36 X; 198/204 X, 208

[56] References Cited
UNITED STATES PATENTS

| | | |
|---|---|---|
| 3,512,668 | 5/1970 | Raitch .................... 214/83.26 X |
| 3,722,197 | 3/1973 | Vermeer ......................... 56/341 |
| 3,837,159 | 9/1974 | Vermeer ......................... 56/341 |
| 3,848,526 | 11/1974 | Mast .......................... 56/341 X |

Primary Examiner—J. N. Eskovitz
Attorney, Agent, or Firm—James E. Nilles

[57] ABSTRACT

A rotary baling machine for forming large, cylindrical bales of cut crop material, such as hay, which uses a conveyor belt and an oppositely moving compacting belt arranged to rotate the hay and form the bale in a baling compartment. The arrangement is such that rotation of the bale is not obstructed by the feed mechanism and the baling compartment is efficiently closed to the escape of cut hay which is delivered thereto to insure that all of the hay finds its way to the bale. At the same time, the operator is afforded maximum visibility of the compartment for properly controlling the bale forming operation. The conveyor belt employed in the machine is endless and spliceless, that is, of one-piece construction, and provision is made for its efficient installation and removal.

25 Claims, 22 Drawing Figures

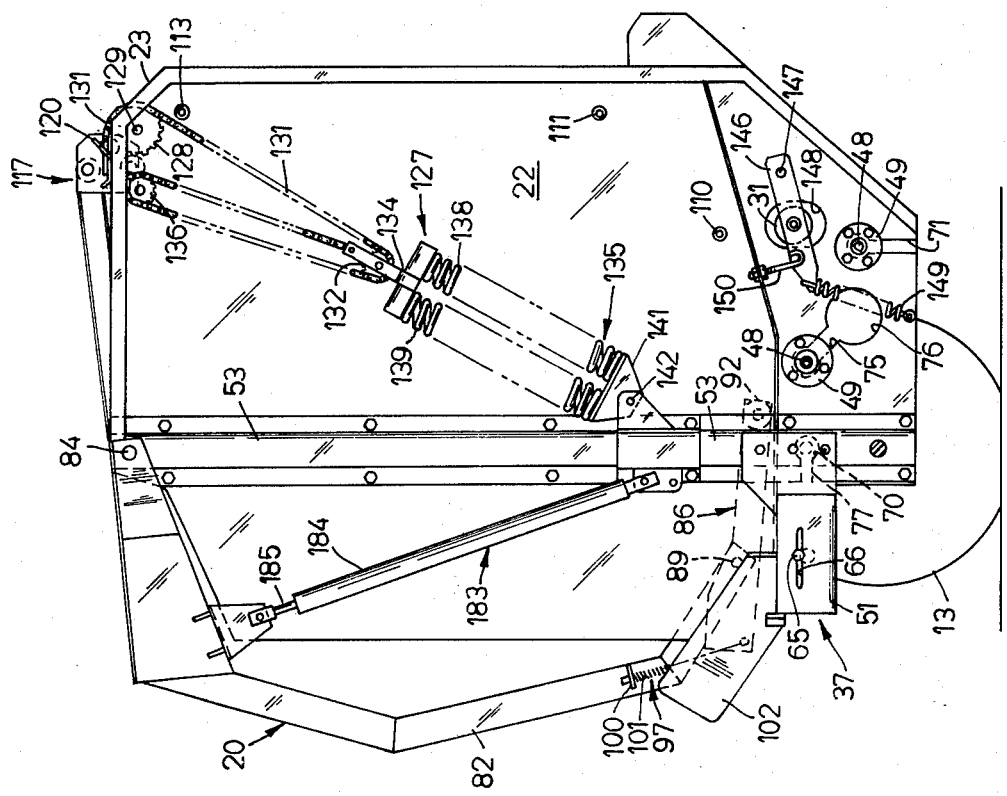
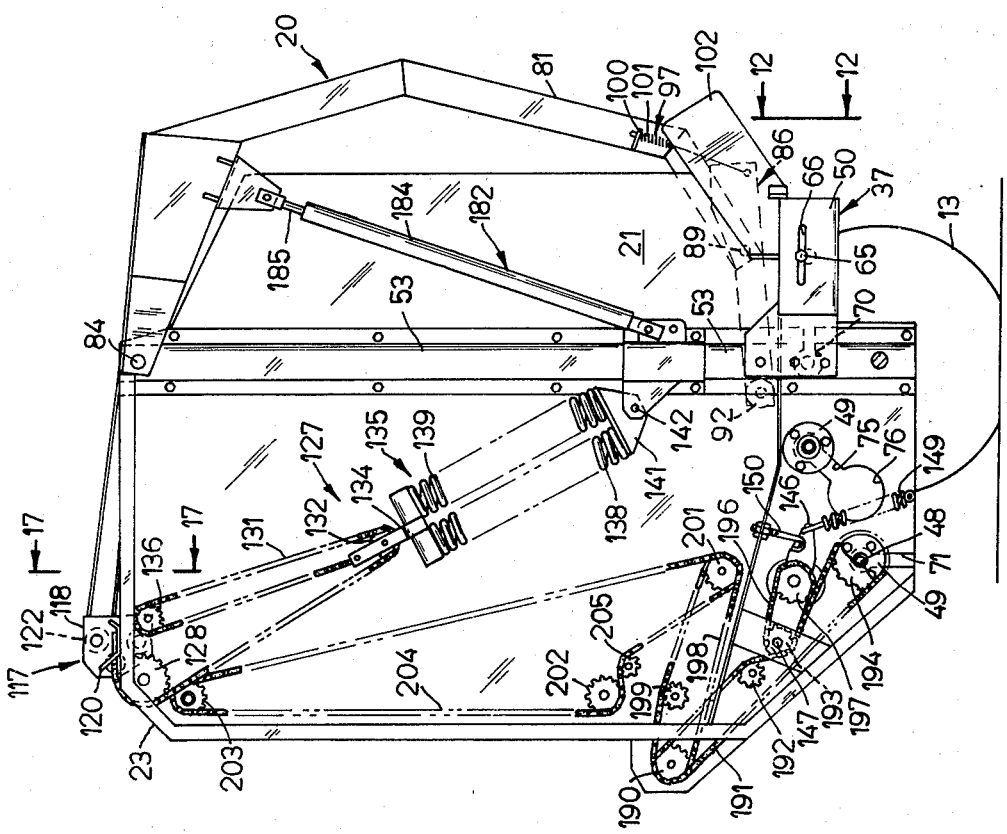
FIG. 9
FIG. 8

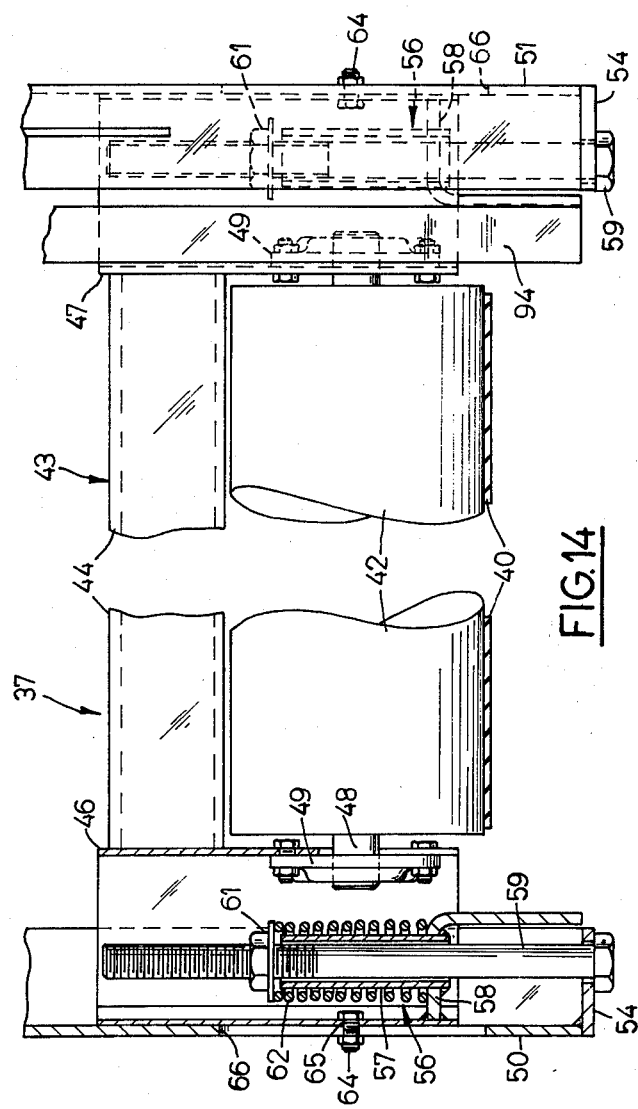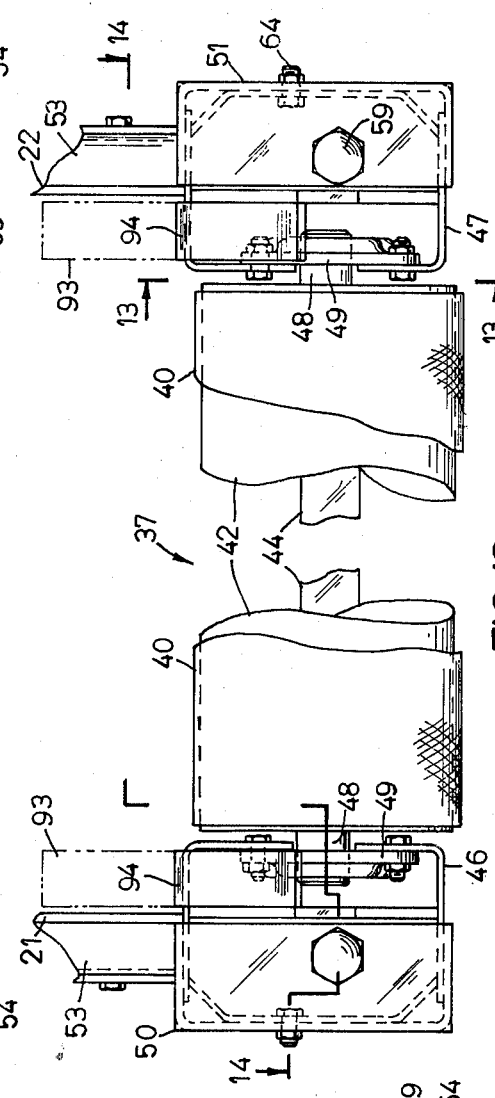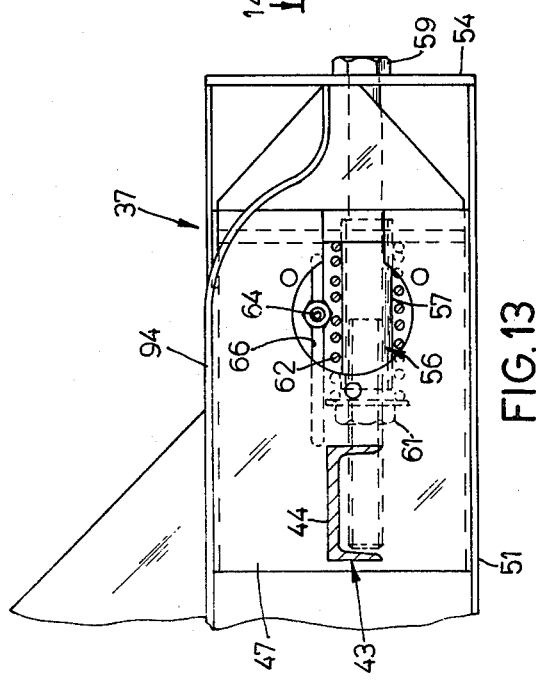

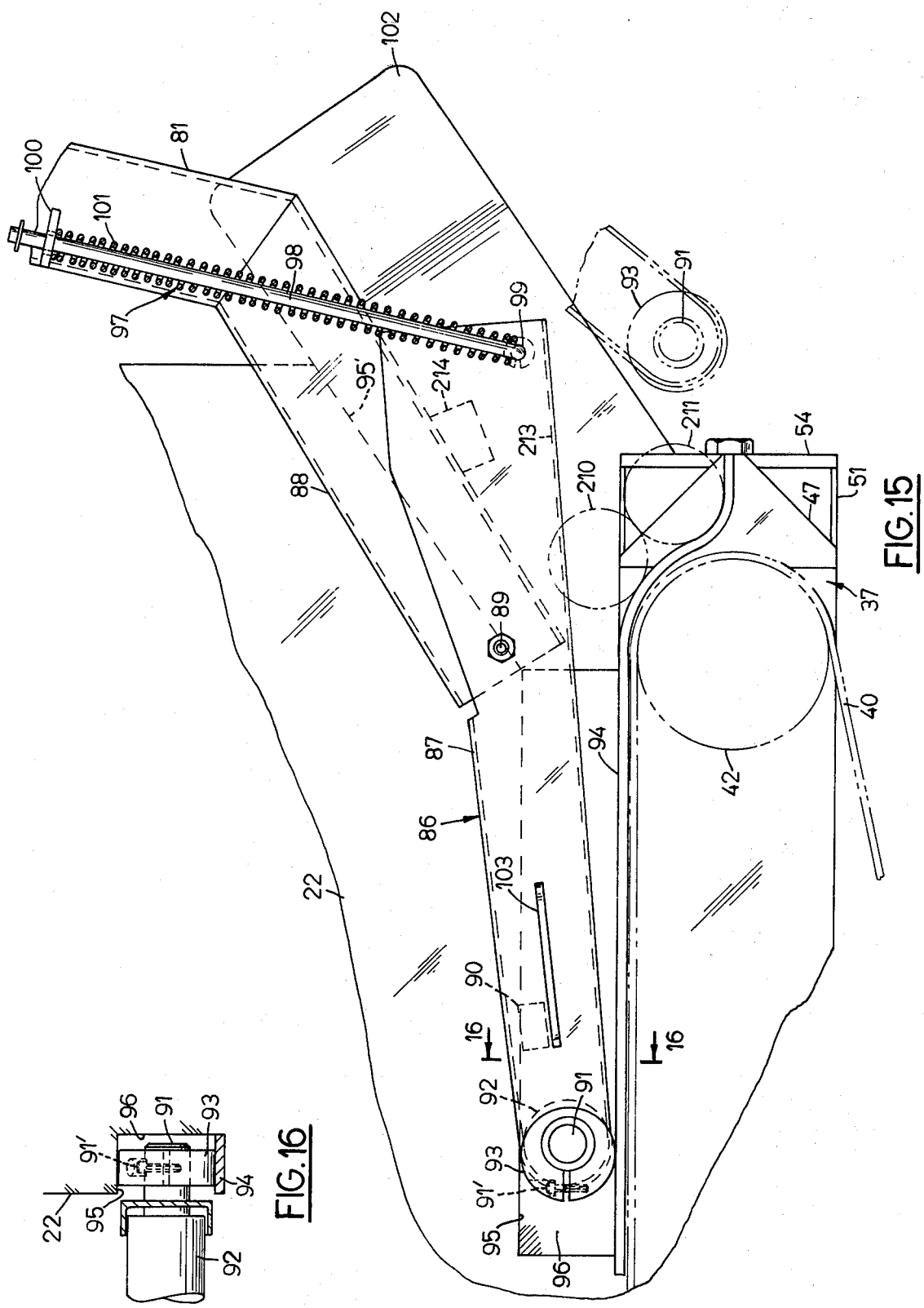

ROTARY BALING MACHINE

BACKGROUND OF THE INVENTION

This invention relates to machines for forming cut crop into bales and, more particularly, into cylindrical bales.

In general, this invention is an improvement over prior art balers of the type which employ belts to rotate and compact a bale on a moving machine such as disclosed in Vermeer U.S. Pat. No. 3,722,197.

In such baling machines hay is received by the baler between a feed or packer roller and a conveyor belt and pressed into a flat, thin mass from which it passes to a core forming area where it is rolled between the conveyor belt and the flight of an oppositely moving belt arrangement. Thereafter, the thin mass of hay is rolled about the core into a bale which continues to increase in size until the desired size is achieved. During its formation, the bale is formed in a zone in which the bale is confined between the belts and the feeder roller. The feeder roller and bale, however, rotate in the same direction with the consequence that the contacting peripheral surfaces move in opposite directions and resist relative rotation, causing hay to wrap around the feeder roller and decrease efficiency or jam the feeding mechanism, rendering the latter inoperative.

In such balers the growing bale deflects and enlarges the length of the belt flight in the bale forming zone, and the increase in length must be accommodated by a mechanism which also serves to maintain the bale forming belt flight tight to apply compacting force to the bale. Such mechanism is accommodated in the baling machine where it obstructs the operator's view of the compartment in which the bale is being formed. This is a serious impairment to the proper operation of the machine since the towing vehicle must be steered from side to side relative to the length of a windrow to insure that hay is fed uniformly over the axial extent of the bale to produce a transversely uniform bale.

In baling machines employing flexible belts, the belts are installed by threading a length of belting material over the rollers which guide the belt and thereafter the adjoining ends are spliced together, usually with a metal fastener. To make a compact belt-type baler, the rollers guiding the belt are of limited diameter making for short turning radii and, because of the large loads imposed on the belts from the compacting force applied to the bale and also from the weight of the bale itself, which can be to the order to 1,500 pounds, the belt splices are subject to frequent damage and failure.

SUMMARY OF THE INVENTION

The present invention provides an improved baling machine for forming cylindrical bales and in which machine none of the rotating mechanism obstructs the rotation of the bale which is being formed. The baler has a forming compartment in which the bale being formed is unobstructed and can be observed by the operator for the purpose of maneuvering the tractor and baling machine relative to a windrow of cut crop for producing a uniform bale.

Another aspect of the invention is to provide a belt-type, cylindrical bale forming machine in which an endless, spliceless belt is used and in which provision is made for the efficient installation and removal from the baling machine.

The invention provides an improved belt-type baler for making cylindrical bales in which (1) the bale is formed efficiently without rotating parts interfering with the bale which is rotated during its formation, (2) in which all of the hay which is received by the baling machine is introduced to and made part of the bale without spillage and waste, (3) in which an endless, spliceless belt is employed to minimize the requirement for service and repair and (4) with all of the mechanism arranged to give the operator maximum visibility to the bale forming compartment, making it possible to control the machine and consquently make a compact bale of uniform cross section.

BRIEF DESCRIPTION OF THE DRAWINGS

FIG. 8 is a left side elevation of the machine but with certain parts removed for clarity;

FIG. 9 is a right side elevation of the machine;

FIG. 12 is an end view of a roller supporting structure for a conveyor belt with parts broken away, the view being taken along line 12—12 in FIG. 8;

FIG. 13 is a view of the roller supporting structure taken on line 13—13 in FIG. 12 but with the roller removed;

FIG. 14 is a partial sectional view taken on line 14—14 in FIG. 12, certain parts being broken away;

FIG. 15 is an enlarged fragmentary side view of one side of the gate mechanism with associated components of the machine illustrated diagrammatically;

FIG. 16 is a fragmentary sectional view taken on line 16—16 in FIG. 15;

DESCRIPTION OF A PREFERRED EMBODIMENT

Figure 1:
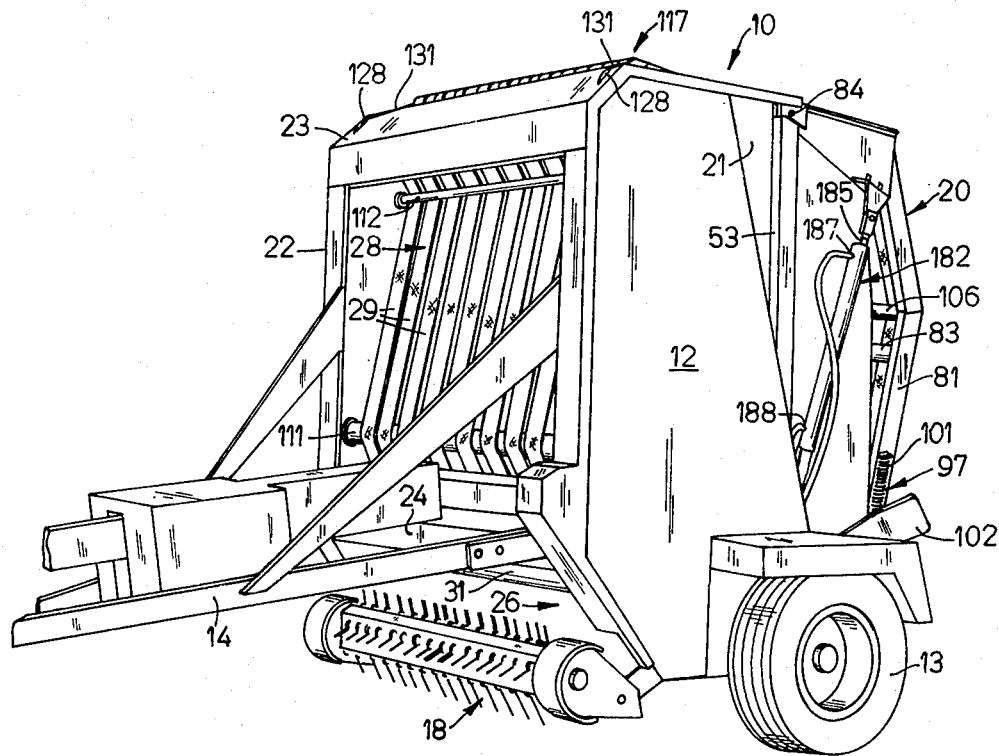
FIG. 1 is a perspective view of a machine for forming cylindrical bales embodying the present invention as viewed from the front and one side of the machine.
Figure 2:
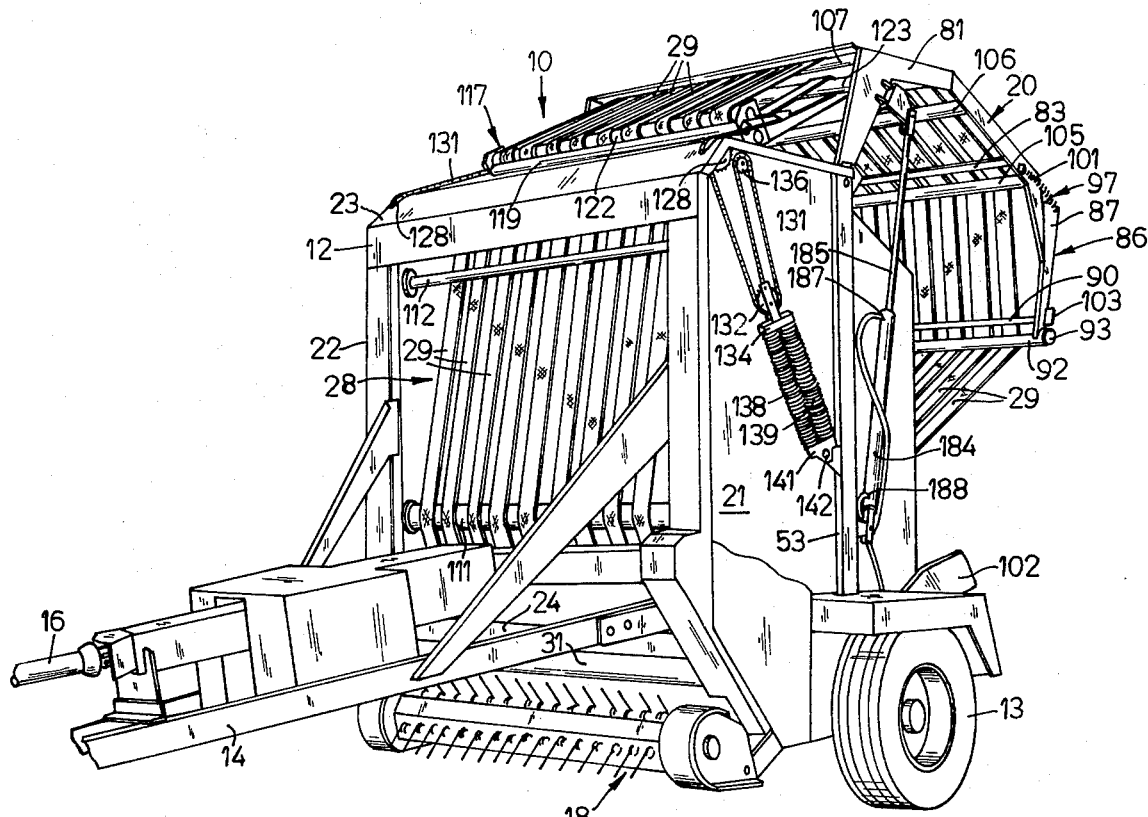
FIG. 2 is a perspective view similar to FIG. 1 but showing the machine after the bale forming operation.

A machine for forming a cylindrical bale which embodies the present invention is designated generally at 10 in FIGS. 1 and 2 and includes a mobile frame or body portion 12 which is supported in elevated position relative to the ground by ground engaging wheels 13. A tongue structure 14 extends forwardly from the body portion 12 and has a forward end which is adapted for a conventional towing connection to a draft vehicle such as a tractor. A drive mechanism 16 is supported from the tongue 14 and is adapted for connection to the usual power takeoff mechanism on the tractor and is the means by which power is supplied to operate various rotating mechanisms of the baling machine 10. A rotary crop pick-up mechanism 18 which rotates about a horizontal, transverse axis is suspended below the tongue 14 from a forward position of the body 12 where it can be lowered into crop engaging position for delivery of cut crop such as hay to the baling machine 10. After the bale is formed, it can be ejected from the body portion 12 of the machine by movement of a rear body portion or gate structure 20 from the closed position in which it is shown in FIG. 1 to the open position shown in FIG. 2.

The main body portion 12 includes a pair of vertically disposed walls 21 and 22 which are held apart in parallel relationship to each other by cross members including an upper cross member 23 and a lower cross member 24. The cross members 23 and 24, together with the tongue structure 14, serve to partially close the forward portion of the body 12 so that, as viewed from the top, the body portion would appear as a generally U-shaped structure, the open end of which faces the rear of the machine 10 and is closed by the gate structure 20.

Disposed between the walls 21 and 22 is a conveyor belt assembly 26 which extends for the full width between the walls and forms a conveying platform extending generally longitudinally of the machine. Also disposed between the walls 21 and 22 is an upper belt assembly 28 formed of a plurality of parallel spaced belts 29 which are supported for movement on the body 12 and on the gate structure 20. Adjacent the forward end of the conveyor belt assembly 26 is a starter or packer roll 31 which, as best seen in FIG. 3, receives cut material from the rotary rake 18 and feeds it between the packer roller 31 and the conveyor belt assembly 26 to a bale forming zone or chamber 32 in which the cut material is rotated to form it into a cylindrical bale.

CONVEYOR BELT

Figure 3:
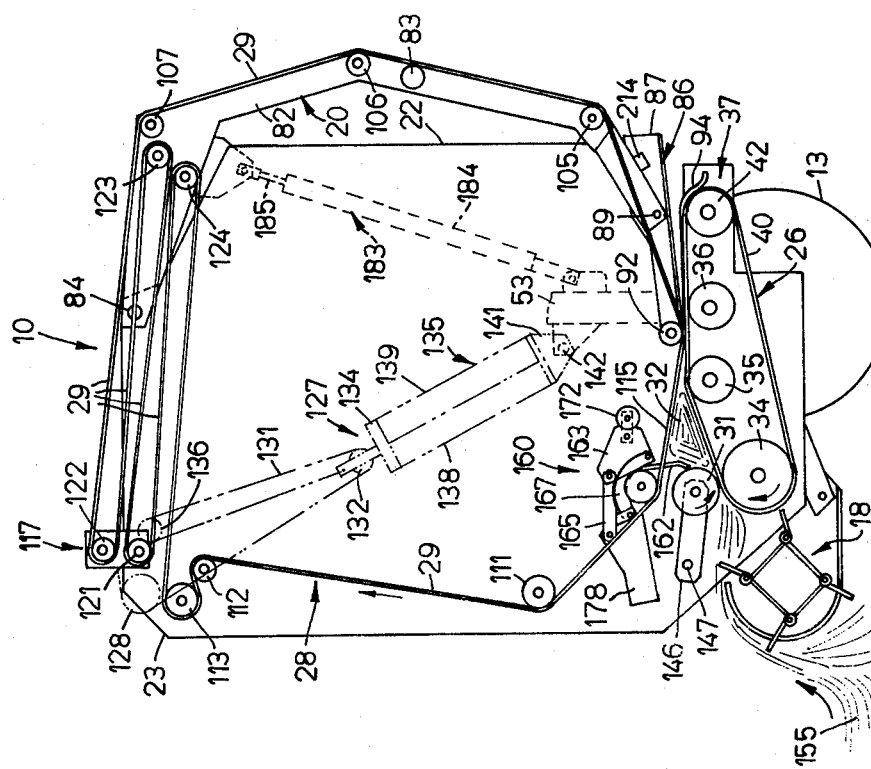
FIG. 3 is a longitudinal sectional view of the machine diagrammatically showing parts of the machine in their relative positions for initiating the forming of a bale.
Figure 10:
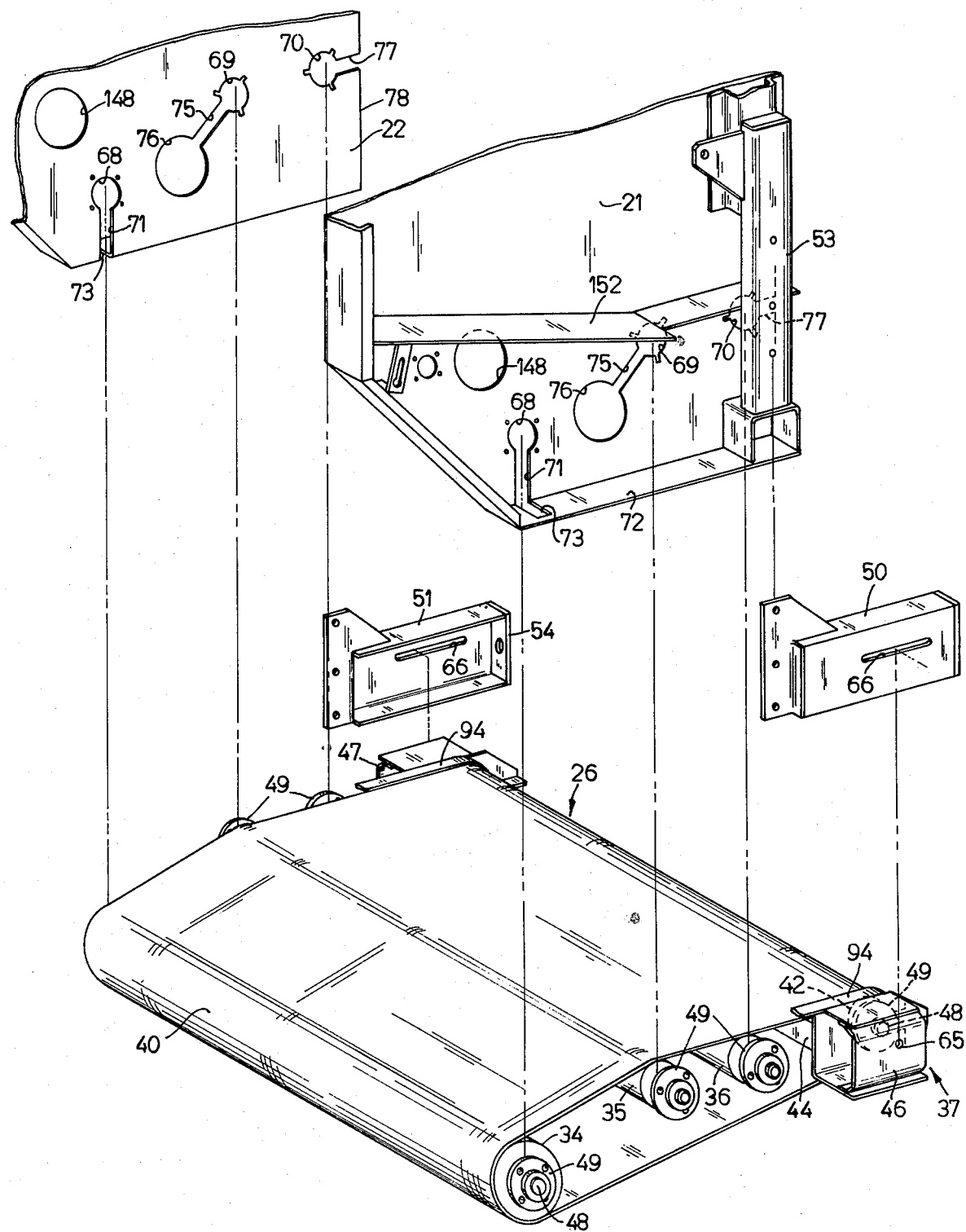
FIG. 10 is an enlarged, exploded, perspective view showing the relative position of a conveyor belt assembly and the associated parts removed from the machine.

The general arrangement of the conveyor belt assembly 26 which is disposed between the walls 21 and 22 will be best understood by viewing FIGS. 3 and 10. The belt assembly 26 includes a driving roller 34 which is driven for rotation in a clockwise direction on a generally horizontal and transverse axis. The belt assembly 26 also includes intermediate idler rollers 35 and 36 which are disposed in spaced parallel relationship to each other and to the axis of rotation of the driving roller 34. The driving roller 34 is disposed at the forward portion and a tensioning roller assembly 37 is disposed at the rearward portion of the conveyor belt assembly 26 with rollers 35 and 36 located between roller 34 and roller assembly 37. A continuous, endless belt 40 which is preferably made of a fabric-reinforced, rubber-like material without any splices, passes over the rolls 34, 35, 36 and the tensioning roll assembly 37.

Referring to FIGS. 12, 13 and 14, the tensioning roll assembly 37 includes a roller 42 which is supported at its opposite ends by a bracket structure 43. The bracket structure 43 includes a cross frame member 44 having a pair of boxlike bracket members 46 and 47 rigidly connected to opposite ends of the cross frame 44. The roller 42 has stub axle portions 48 at its opposite ends which are rotatably supported in bearing assemblies 49 which are bolted within the boxlike brackets 46 and 47. The boxlike brackets 46 and 47 are adapted to slide in complementary guide members 50 and 51, respectively, each of which is rigidly fastened by bolts or the like to an associated main frame member 53, one of which is disposed at each side of the body as seen in FIGS. 8 and 9. Each of the guide members 50 and 51 is generally channel shaped in cross section and have a rear portion closed by a gusset 54. The boxlike brackets 46 and 47 of the bracket structure 43 slide within the corresponding guide members 50 and 51 and are urged rearwardly of the machine 10 or in a downward direction, as viewed in FIG. 14, by a pair of spring arrangements 56 which are generally identical at the left and right side of the machine. Each of the spring assemblies 56 includes a tubular element 57 which projects within the boxlike bracket 46 or 47 from an end wall portion 58. A bolt 59 passes through an opening in the gusset 54 and through the tubular member 57. The threaded end of the bolt 59 is provided with a nut and washer assembly 61 which forms an adjustable spring seat arrangement for a compression spring 62. The spring 62 is coiled around the tubular member 57 and has its opposite end seated against the associated end wall 58. The springs 62 act between the walls 58 of the brackets 46 and 47 and the nut and washer assemblies 61 anchored relative to the guide members 50 and 51 to urge the entire bracket structure 43 together with the tensioning roller 42 rearwardly of the machine or downwardly as viewed in FIG. 14.

A sliding bolt 64 passes through an opening 65 in each of the boxlike brackets 46 and 47 and through a slot 66 in each of the guide brackets 50 and 51 to limit the extent of movement of the bracket structure 43 relative to the brackets 50, 51 and the body of the machine 12.

Referring to FIG. 10, the rolls 34, 35 and 36, together with the roller 42, are disposed between the walls 21 and 22 of the baling machine 10 and are enveloped within the continuous, spliceless belt 40. Unlike belts which are spliced together after a length of belting material has been threaded over rollers, provision is made for installation and removal of the belt as a unitary, endless structure. Each of the rollers 34, 35 and 36 has integral stub axles 48 at its opposite ends which are similar to the axles 48 at the ends of the roller 42. The stub axles 48 of the rollers 34, 35 and 36 are journalled in bearings assemblies 49 which also are similar to the bearing assemblies 49 of the rear roller 42. The bearing assemblies 49 associated with opposite ends of the drive roller 34 are bolted in a position over an opening 68, one of which is formed in each of the side walls panels forming a lower part of the walls 21 and 22. The bearing assemblies 49 of the roller 34 are positioned on outer surfaces of the inner panels of the walls 21 and 22, as seen also in FIGS. 8 and 9, so that the stub axles project slightly through the openings 68. In a similar manner bearing assemblies 49 at opposite ends of the roller 35 are bolted in position adjacent openings 69 and the bearing assemblies 49 at opposite ends of the rollers 36 are bolted adjacent the openings 70.

The opening 68 at opposite ends of the roller 34 and in the walls 21 and 22 are each open to a guide slot 71 formed in each of the walls 21 and 22 and extending generally downwardly in parallel relation to each other. The lower ends of the walls 21 and 22 are each formed with a reinforcing flange 72 and each of the vertically extending slots 71 terminates in a horizontal slot 73 formed in the flange 72. The slots 71 and 73 at opposite sides of the machine 10 provide passage means by which the roller 34 may be installed or removed from the machine by removing the bolts securing the bearing assemblies 49 to the walls 21 and 22 and removing the bearings from the axles at opposite ends of the roller 34. Thereafter, the roller 34 can be moved downwardly with the axles 48 moving in the slots 71 and through the slots 73 to a removal opening formed below the walls 21 and 22.

Each of the openings 69 associated with opposite ends of the idler roller 35 are open to slots 75 formed in each of the walls 21 and 22 and extending in parallel relationship to each other, generally downwardly and forwardly to open to access or removal openings 76 having closed configurations. After the bearing assemblies 49 associated with opposite ends of the idler roller 35 are dismounted from the wall portions 21 and 22 and removed from their axles 48, the roller 35 may be moved downwardly with the axles at opposite ends of the roller moving in the parallel slots 75 and into alignment with the opening 76. The roller 35 may then be moved endwise or transversely of the machine 10 through either of the roller removal openings 76 from within the confines of the endless conveyor belt 40 and from between the walls 21 and 22.

The openings 70 associated with opposite ends of the idler roller 36 are open to slots 77 which extend rearwardly and open to the rearward end portions 78 at the lower end of each of the walls 21 and 22. The slots 77 provide means by which the axles 48 of the idler roller 36 may be moved rearwardly in the side walls 21 and 22 to the removal opening formed rearwardly of the end portions 78 upon detachment of the associated bearing assemblies 49 from the latter.

The procedure by which the continuous, spliceless conveyor belt 40 may be removed from the assembled machine is initiated by turning the heads of the bolts 59 which are seen in FIG. 14, to cause the nut and washer assemblies 61 to be threaded towards the free ends of the bolts. This relieves the compression of the springs 62 and consequently the tension of the belt 40. When the nut and washer assemblies 61 reach the ends of the bolts 59 they may be removed to permit removal of the springs 62 and the bolts 59 at either side of the structure. Thereafter, the sliding bolts 64 can be removed from the slots 66 and the bracket structures 50 and 51 associated with the walls 21 and 22 may be removed from the frame posts 53. At this point the roller 42 and bracket structure 43 is no longer supporter relative to the machine and the bracket structure 43 and the roller 42 may be moved as a unit generally axially of the roller 42 and through either of the open sides of the belt 40.

Removal of the bracket structure 43 and the roller 42 from within the confines of the belt 40 serves to expose the rearward ends of the slots 77 associated with the openings 70 at opposite ends of the idler roller 36. Detachment of the bearings 49 associated with the roller 36 permits the axles 48 of the roller 36 to be moved rearwardly in the slots 77 to a position rearwardly of the wall edge portion 78 from which the roller 36 may be moved axially through either of the open side portions of the belt 40. Thereafter the bearings 49 associated with the idler roller 35 may be detached from the side walls 21 and 22 and removed from the associated axles 48. The roller 35 may be moved downwardly and forwardly with the associated axles in the slots 75 to the access opening 76 from which it may be moved laterally of the machine 10 and longitudinally of the roller axis through either of the access openings 76. The remaining driving roller 34 can thereafter be removed by detaching its associated bearings 49 and lowering the roller so that the axles 48 move in the slots 71 and 73 at opposite sides of the machine. In this manner, the roller 34 can be lowered to the ground and removed from either side of the belt 40. At this point all parts have been removed from the inside of the belt 40 and the belt can be taken from between the walls 21 and 22. Assembly and installation of the belt into the machine 10 can be accomplished with a reversal of the belt removal procedure.

As seen in FIGS. 3 and 10, the conveyor belt assembly 26, which incorporates the belt 40, includes an upper run or flight portion extending from the driving roller 34 and over the idler rollers 35 and 36 to the tensioning roller 42. This forms a rearwardly moving belt flight which receives crop from the rotary rake 18 and delivers it rearwardly in the machine 10 between the walls 21 and 22. The portion of the flight between the rollers 34 and 35 is inclined upwardly and rearwardly to elevate the crop material to the generally horizontal platform afforded by the belt 40 passing between the rollers 35 and 42.

GATE STRUCTURE

The gate structure 20 at the rear of the body 12 includes a pair of generally C-shaped side frame members 81 and 82 which can be seen in FIGS. 8 and 9 ridgly connected together in parallel spaced relationship by a plurality of cross members 83 which can be seen in FIG. 2. The upper ends of the frame members 81 and 82 are pivotally connected at the upper ends of the walls 21 and 22, respectively, by means of pivot members 84 passing through upper ends of the left and right vertical frame members 53 and the C-shaped side frame members. By means of the pivot members 84, the gate structure 20 is supported for swinging movement on a transverse axis formed by the pivots 84 between the closed position shown in FIG. 1 and the open position shown in FIG. 2.

A gate extension structure 86 is formed at the lower ends of the C-shaped frame members 81 and 82 and includes a pair of left and right parallel arms 87. As seen in FIG. 15, showing the left arm 87, an intermediate portion is pivotally connected to the outside of the associated lower end of the C-shaped frame members 81 by means of a bolt 89. The left arm 87 is rigidly connected to one end of a cross member 90 extending transversely of the machine 10. Similarly, the right arm 87 is pivoted to the C-shaped member 82 and is rigidly connected to the opposite end of the cross member 90. The arms 87 and the cross member 90 pivot as a unit about the pivot axis afforded by the bolts 89. The forward ends of the arms 87 of the gate extension 86 support the opposite ends of an axle 91 on which a roller 92 is mounted for rotation about an axis transverse to the machine 10. As seen in FIGS. 15 and 16, the outer left end of the axle 91 is provided with an eccentric cam member 93. The cam member 93 is generally circular in shape and has an eccentric opening to receive an end of the axle 91. The cam member 93 is split and is provided with a bolt 91' by which the cam member 93 can be rotated to various positions on the stationary axle 91 and the bolt 91' can be tightened to clamp the eccentric member 93 in a fixed position on the axle. An identical cam member 93 is formed at the opposite end of the axle 91.

As seen in FIGS. 15 and 16, the cam members 93 are adapted to rest on top of a guide rail 94 which is formed on an upper portion of the box-like brackets 46 and 47 at opposite sides of the machine 10. An upper guide surface 95 is associated with each of the guide rails 94 and is formed in the side walls 21 and 22 to extend generally parallel to the guide surface 94. A wall portion 96 extends downwardly from the upper guide surface toward the guide rails 94. In the closed position of the gate structure, as shown in FIG. 15, the guide portion 95 serves to prevent the cam member 93 at the end of the axle 91 from raising upwardly relative to the belt 40 during movement of the roller 92 rearwardly and horizontally. The cam members 93 can be adjusted by rotating and locking them in selected positions on opposite ends of the axle 91 to adjust the maximum spacing between the material confining roller 92 and the conveyor belt 40. By maintaining this spacing at a minimum, passage of cut crop material through the rear of the machine is obstructed and the material remains in the bale forming zone.

Each of the arms 87 of the gate extension 86 is provided with a spring assembly 97 which includes an L-shaped rod 98 having its lower leg pivoted at 99 to an associated arm 87. The opposite ends of the rods 98 are slideably supported in openings in brackets 100 rigidly connected to an outboard side of each of the C-shaped frame members 81 and 82. A spring 101 is supported on each of the rods 98 and in the open position of the gate structure, the springs serve to counter-balance the roller 92 at the forward end of the gate extension structure 86 to maintain it in a slightly elevated position for easy entrance from its open to its closed position.

Figure 11:
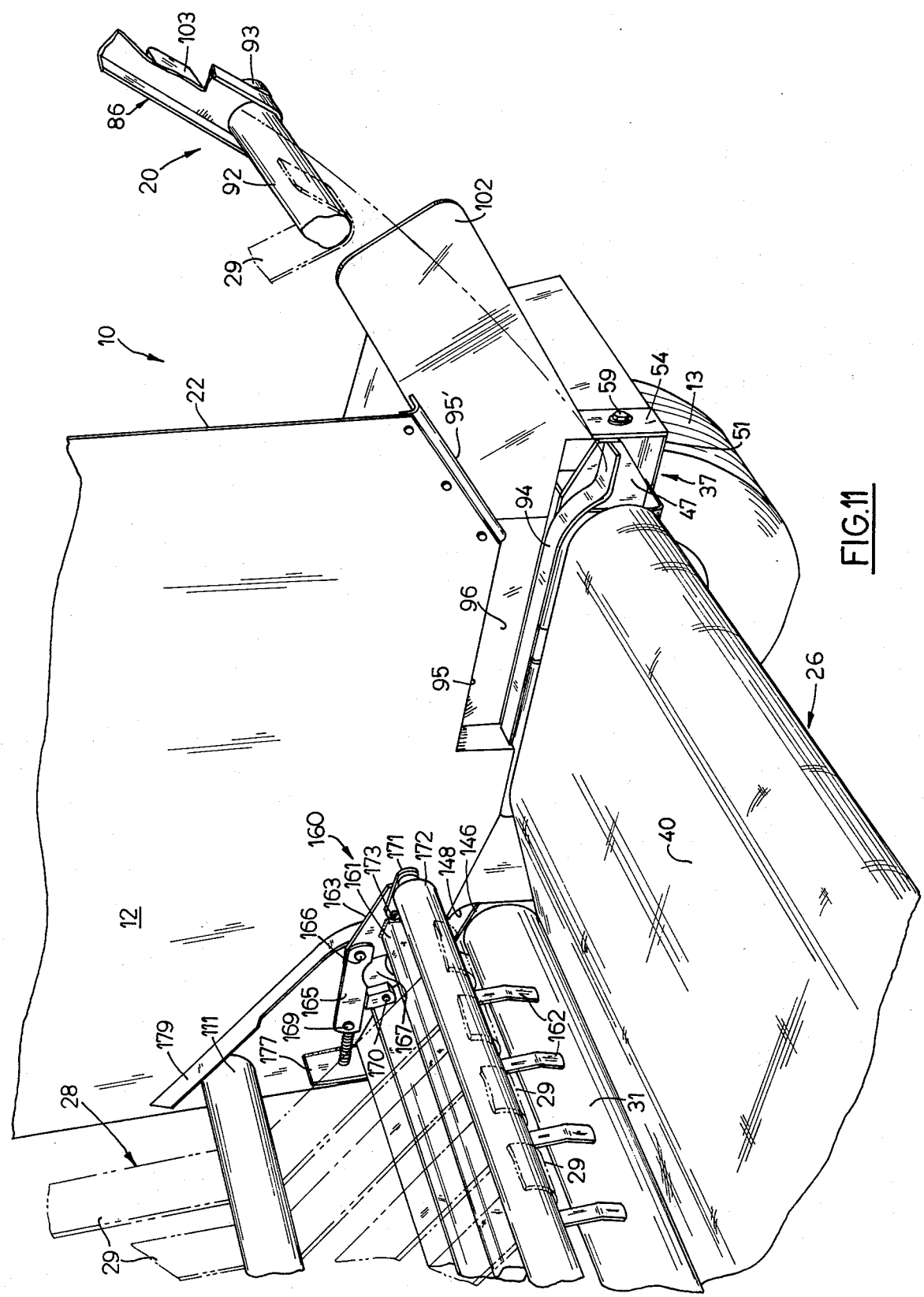
FIG. 11 is an enlarged, fragmentary, perspective view, with parts broken away, as viewed generally from the rear and one side of the machine.

Entrance of the gate extension structure 86 and the roller 92 to the closed position of the gate 20 also is facilitated by wing guides 102 which, as seen in FIGS. 8 and 9, are disposed at opposite sides and to the rear of the machine 10 to cooperate with shoe members 103 on the outboard sides of each of the arms 87. As seen in FIG. 11, the forward end of the wing guide 102 is in generally the same plane with the guide wall 96. The rearward end of the guide member 102 is bent outwardly of the machine 10, as seen in FIGS. 1 and 2, so that the spacing of the rearward ends of the wing guides 102 at opposite sides of the machine is greater than at the forward ends thereof. An extension of the guide surface 95 is formed by a guide plate 95' which is inclined upwardly and rearwardly as seen in FIG. 11. As the gate 20 approaches its closed position the shoe members 103 at opposite sides of the gate extension 86 pass between the wing guides 102. In the event that there is any distortion of the gate 20 during such movement, one of the shoe members 103 can engage the associated wing guide 102 and shift the roller 92 laterally into an aligned position. The plate 95' serves to guide the upwardly biased end of the gate extension 86 downwardly and into the guide track formed by the parallel surfaces 94 and 95 as the gate closes.

UPPER BELTS AND TAKE-UP MECHANISM

The upper belt assembly 28 serves to act with the conveyor belt 40 to rotate the cut crop material. The belt assembly 28 includes a plurality of transversely spaced belts 29 which are trained over a plurality of generally similar rollers 105, 106 and 107 rotatably mounted on the gate 20 in parallel relation to each other and to the roller 92 on the gate extension 86. The relative disposition of the rollers 105, 106 and 107 at the rear of the gate structure 10 can be seen from an examination of FIG. 3. In addition, a plurality of similar rollers 110, 111, 112 and 113 are disposed on the frame or body portion 12 for rotation about spaced, parallel axes extending transversely of the machine 10. The rollers 92, 105 through 107 and 100 through 113 are used to guide the plurality of belts 29 which, as seen in FIGS. 1 and 2, are disposed in transversely spaced and parallel relationship to each other. As seen in FIGS. 3 through 7, the belts 29 move in a generally clockwise direction in sequence from the roller 107 to the rollers 106, 105, 92, 110, 111, 112 and 113. Since the belts 29 move in such a direction, it will be noted from an examination of FIG. 3 that a lower run or flight 115 of the belts 29 is formed between the roller 92 and the roller 110. The flight 115 moves in a counter direction to the rearwardly moving conveyor belt 40.

Figure 4:
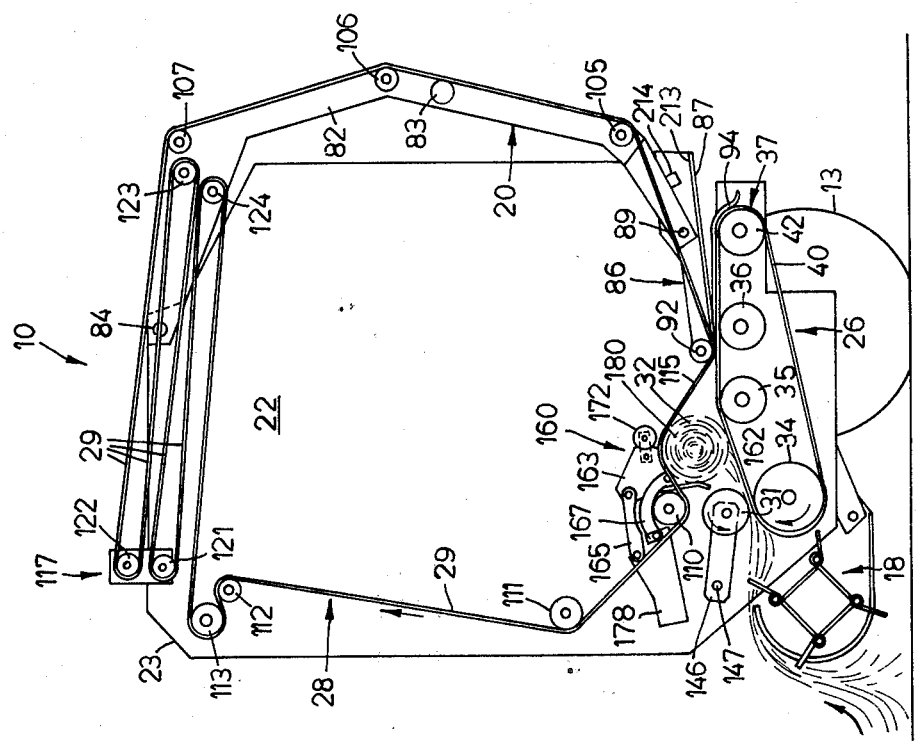
FIG. 4 is a view similar to FIG. 3 showing the relative position of parts when the bale commences formation.

The oppositely moving upper flight of the conveyor belt 40 and the lower flight 115 of the belts 29 serve to rotate crop material which is continuously delivered between the belts 29 and belt 40 causing the belt flight portion 115 to deflect, for example, as seen in FIG. 4. This deflection of the belt 29 is accommodated by a belt take-up or shuttle assembly 117.

Figure 6:
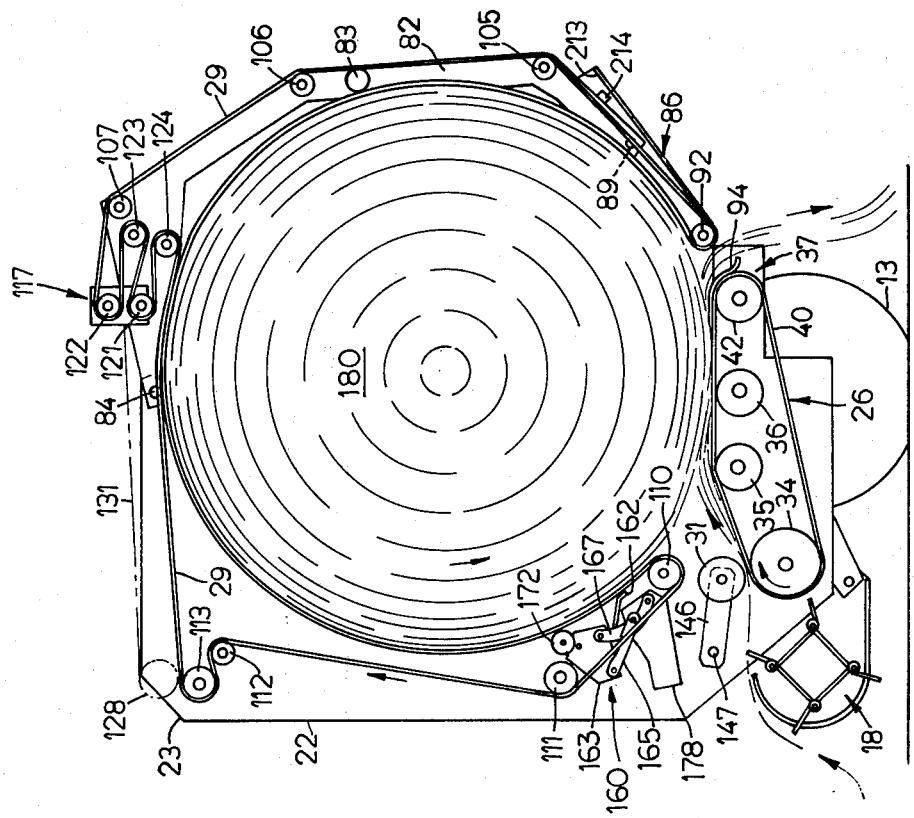
FIG. 6 is a view similar to FIG. 5 showing the relative position of the parts when the bale has reached its maximum size.
Figure 19:
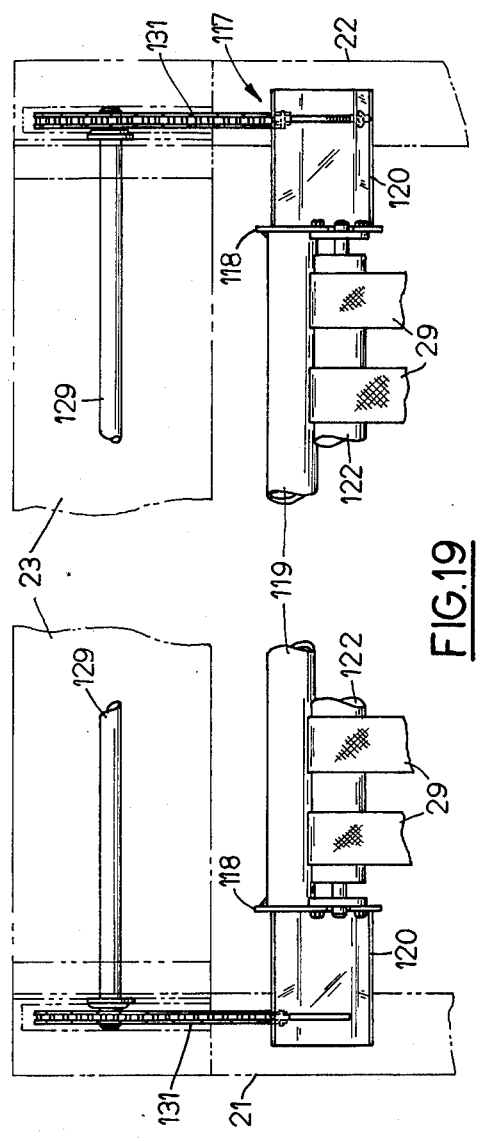
FIG. 19 is a top view of the mechanism shown in FIG. 17.
Figure 17:
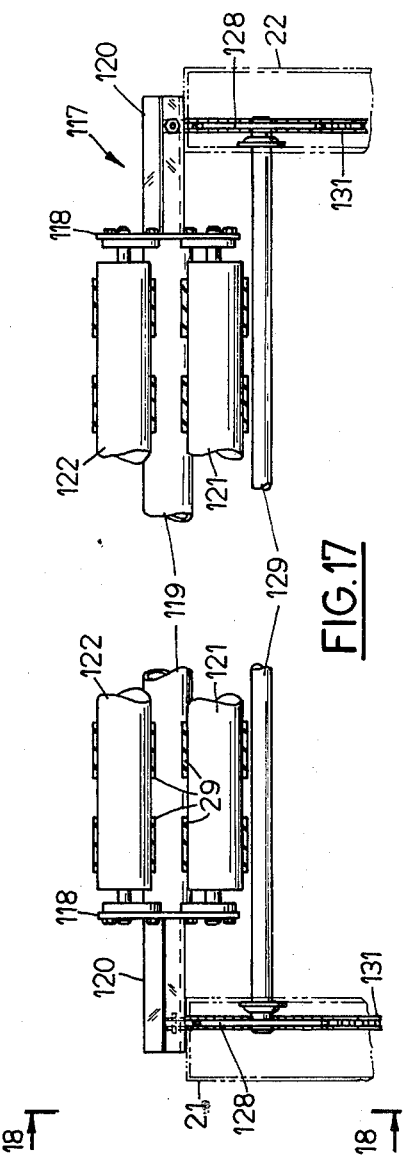
FIG. 17 is a fragmentary, elevation view, in section, of an upper portion of the machine, the view being taken generally along line 17—17 in FIG. 8, but on an enlarged scale.
Figure 18:
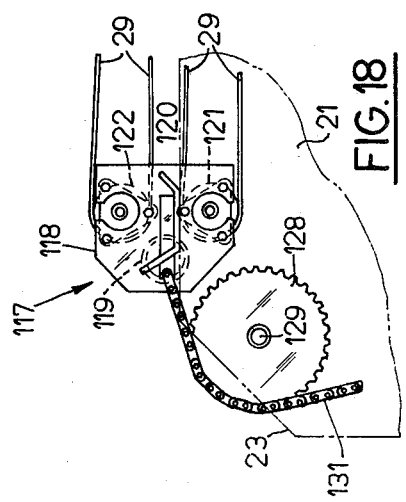
FIG. 18 is an end view of the structure shown in FIG. 17 taken along line 18—18 in FIG. 17.

As best seen in FIGS. 17, 18 and 19, the shuttle assembly 117 includes a pair of bracket plates 118 which are rigidly connected to opposite ends of a cross bar 119. The bracket plates 118 are each provided with a guide shoe 120 which is rigidly connected to the corresponding plate 118 and extend in opposite directions from each other to rest on an upper forward portion of the walls 21 and 22 of the body 12 when the shuttle assembly 117 is in the position shown in FIG. 3. Disposed between the plates 118 and in parallel relationship to each other and to the cross bar 119 are shuttle rollers 121 and 122. An upper portion of the gate mechanism 20 disposed to the rear of the machine 10 is provided with a similar pair of rollers 123 and 124 which are disposed to rotate on axes parallel to each other and to the rollers 121 and 122. Referring now to FIG. 3, after the belts 29 pass over the roller 113 they are trained over the roller 124 on the gate structure 20 from which they pass to the shuttle roller 121 and back to the gate roller 123. From the gate roller 123 the belts pass over the shuttle roller 122 and back to the gate roller 107. The shuttle assembly 117 is allowed to move from the position in which it is shown in FIG. 3 toward the position in which it is shown in FIG. 6 at the rear of the baling machine as a result of the deflection of the belts 29 and particularly the deflection of the belt flights 115 between the rollers 92 and 110.

The shuttle assembly 117 is urged toward the position in which it is shown in FIGS. 3, 8 and 9 by tensioning mechanisms at opposite sides of the machine 10 as indicated generally at 127 in FIGS. 8 and 9. A pair of sprockets 128 which, as best seen in FIG. 18, are rotatably supported in the walls 21 and 22 and are interconnected by a torsion shaft 129 extending across the top of the machine so that the sprockets 128 turn in unison. As seen in FIG. 8, a chain 131 associated with the wall 21 has one end fastened to one side of the shuttle assembly 117 from which it extends over a sprocket 128 to another sprocket 132 supported on a bracket member 134 forming part of a spring assembly 135. From the sprocket 132, the chain 131 passes over an idler sprocket 136 mounted on the wall 21 and back to the bracket member 134 where the other end of the chain 131 is fastened. As seen in FIG. 9, a similar chain 131 is installed at the right side of the machine on the wall 22 to extend between the shuttle 117 and another spring assembly 135.

Each of the spring mechanisms 135 include a pair of parallel tension springs 138 and 139 having upper ends connected to the bracket 134 and the lower ends connected to a support member 141 which is pivotally connected to the vertical frame post 53 at a point 142.

The spring assemblies 135 at opposite sides of the machine 10 and associated with the walls 21 and 22, urge the corresponding bracket members 134 downwardly as viewed in FIGS. 8 and 9 to maintain tension on the chains 131 so that the shuttle assembly 117 is urged toward a starting position at the forward part of the body 12 to maintain tension on the belts 29 to resist deflection of the flight portion 115 of the belts 29 passing between the rollers 92 and 110. The sprockets interconnected by the shaft 129 turn in unison to insure that the chains 131 at opposite sides of the machine are fed at the same rate to maintain all of the belts 29 under uniform tension.

STARTER ROLLER

The packer or starter roller 31 acts with the conveyor belt 40 to compact crop material received from the rotary rake and to convey the compacted material rearwardly in a generallly flat, sheet-like mass.

Figure 20:
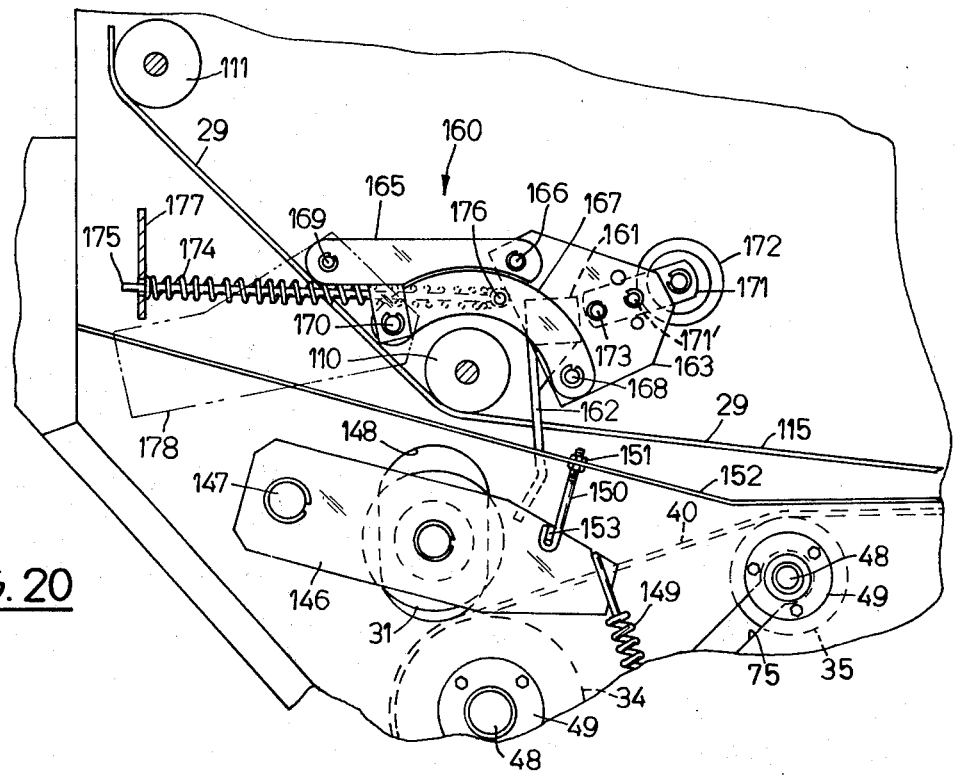
FIG. 20 is a fragmentary side view on an enlarged scale and with parts broken away, showing the starter mechanism within and at one side of the baling machine.
Figure 21:
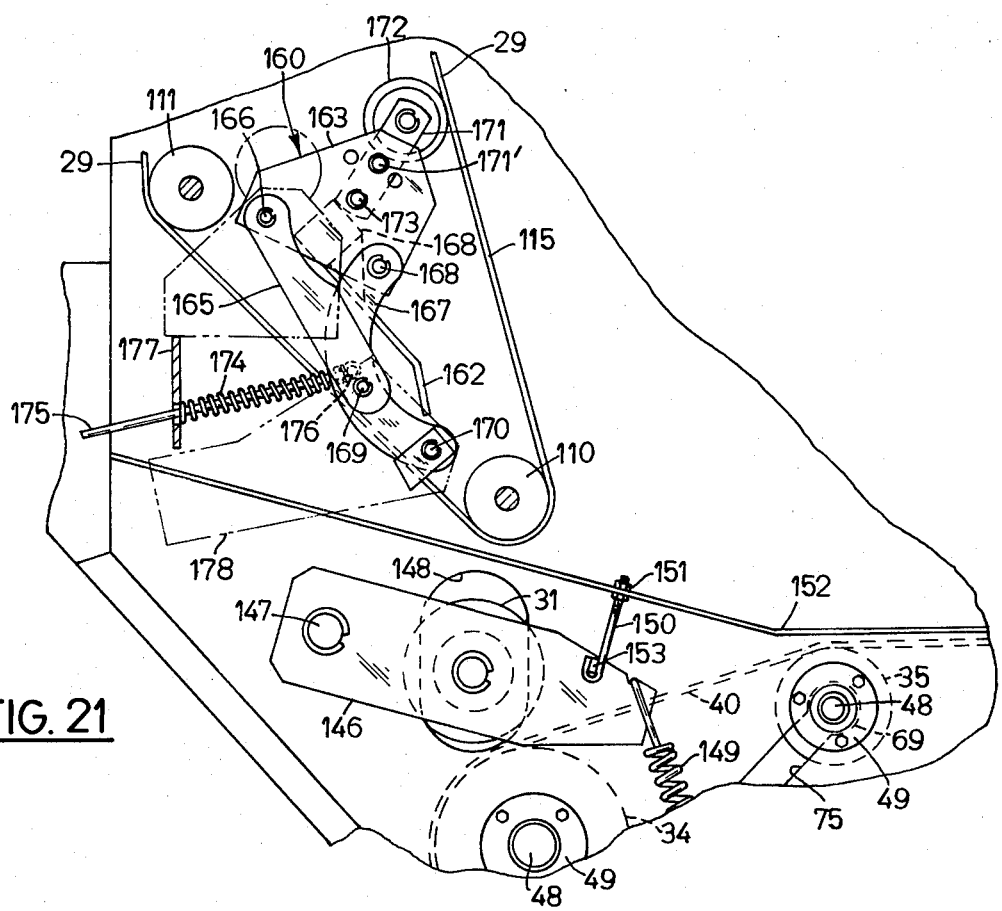
FIG. 21 is a view similar to FIG. 20 showing another condition of operation of the starter mechanism.

Referring to FIG. 3, and more particularly to FIGS. 20 and 21, the packer or starter roller 31 is disposed to rotate on a transverse axis in parallel relation to and between the driving roller 34 and the roller 110 associated with the belts 29. The packer roller 31 is rotatably supported at its opposite ends to a pair of bracket arms 146 which are disposed at opposite sides of the machine in association with the walls 21 and 22. The arms 146 are mounted at the other side of the walls 21 and 22 for swinging movement about pivots 147 and the roller 31 is allowed to move vertically relative to the conveyor belt 40 and between the walls 21 and 22. Access openings 148 in each of the walls 21 and 22 accommodate the vertical movement of the roller 31. The roller 31 is maintained in close proximity to the belt 40 as it passes over the roller 34 by means of a tension spring 149 associated with the rearward end of each of the arms 146 and urging the arms downwardly. Downward movement of the packer roller 31 is limited by a pair of threaded hook elements 150 fastened by means of nuts 151 to a flange of each of the side walls 21 or 22. The hook elements 150 are adapted to engage tabs 153 connected to each of the arms 146 to limit downward movement of opposite ends of the roller 31. The springs 149 act to resist upward movement of the packer roller 31 away from the conveyor belt 40.

Referring to FIG. 3, the packer roller 31 is so disposed that cut crop material is delivered by the rotary rake mechanism 18 to the space between the rearwardly moving belt 40 passing over the roller 34 and the counterclockwise rotating packer roller 31. The close spacing between the belt 40 and the packer roller 31 tends to compress the cut crop material into a relatively thin sheet of crop material for delivery rearwardly on the belt 40.

BALE STARTING MECHANISM

A core or bale starting chamber 32 is formed by the upper run of the conveyor belt 40 passing from the roller 34 over the roller 35 to the roller 36. The upper portion of the core starting chamber 32 is formed by the lower flight 115 of the belts 29 passing from the material confining roller 92 to the roller 110. Due to the close spacing of the roller 92 with the belt 40, the rearward portion of the core chamber is closed to the rearward passage of material. The space between the roller 34 and the roller 110 at the forward portion of the bale or core starting chamber 32 is partially closed by a starter assembly 160 which also separate the bale starting zone 32 from the packer roller 31.

As seen in FIG. 11, the bale starter assembly 160 includes a crossbar 161 of rectangular cross section to which are attached a plurality of transversely spaced fingers 162. The fingers 162 are shown disposed in the spacing between the uniformly spaced belts 29 to depend downwardly behind the packer roller 31. Rigidly connected to opposite ends of the crossbar 161 are a pair of generally similar plate members 163, one of which is seen in FIG. 11 and the other in FIGS. 19 and 20. Each of the plate members 163 is pivotally connected to an upper link 165 at a point 166 and to a curved lower link 167 at a pivot point 168. The forward portions of the links 165 and curved lower links 167 are connected to brackets 178 rigidly supported relative to the body member 12 for pivoting at points 169 and 170.

Each of the plate members 163 is provided with an arm 171 which supports one end of guide roller 172 to extend transversely between the walls 21 and 22. Each arm 171 is pivoted to the associated plate member 163 at a pivot bolt 173. The arms 171 may be adjusted relative to the plate member 63 by means of bolts 171' passing through the arms 171 and selected openings in the plates 163.

In FIG. 20, the guide roller 172 is shown vertically spaced from belts 29 and, particularly, from the flight portion 115. However, during formation of bale, the belt flights 115 are deflected upwardly so that the opposite sides of the belts 29 ultimately engage the guide roller 172, as shown in FIG. 4. Thereafter, as the bale is being formed and increases in size, the plates 163 move the bar 161 and associated fingers 162 upwardly. The bracket plates 163, which are similarly guided by links 165 and 167, are moved generally upwardly and forwardly to a position at a lower forward portion of the machine 10 in which the fingers 162 are disposed above the roller 110 and as seen in FIG. 6 and below the center of the bale.

Movement of the starter assembly 160 from the bale starting position in which it is shown in FIG. 20 to the completed bale position shown in phantom in FIG. 21 is resisted by a pair of compression springs 174 which acts between opposide ends of the starter assembly 160 and the frame or body 12. Each spring 174 is coiled around a rod 175 pivoted to an intermediate portion of the associated curved link 167 at a point 176 and has a free end extending through an opening in a bracket 177 mounted on the body 12. The spring 174 is compressed as the rod 175 slides relative to the bracket 177 during upward movement of the starter assembly 160 from the bale starting position in FIG. 20 to the inoperative position shown in phantom in FIG. 21. In the latter position, the bale will have grown to approach the size seen in FIG. 6 and the starter assembly will be adjacent the material confining roller 110.

To protect the bearing ends of the material confining roller 110 and the roller 111 from particles of crop material falling from the bale, a deflector 179, as seen in FIG. 11, is attached to the side wall 22 and a similar deflector, not shown, is attached to the wall 21.

HYDRAULIC CIRCUIT

A pair of hydraulic cylinders 182 and 183 are associated with opposite sides of the baling machine and are used for the purpose of opening and closing the gate structure 20 relative to the body 12 of the baling machine. In addition, the hydraulic cylinders 182 and 183 are employed during the bale forming operation to assist the springs in maintaining tension on the bale which is being formed.

As seen in FIGS. 8 and 9, the hydraulic cylinders 182 and 183 have their cylinder portions 184 pivotally supported from the vertical frame members 53 and the free end of the rod members 185 pivotally connected to the C-frame members 81 of the gate 20 at points rearwardly of the gate pivots 84.

Figure 22:
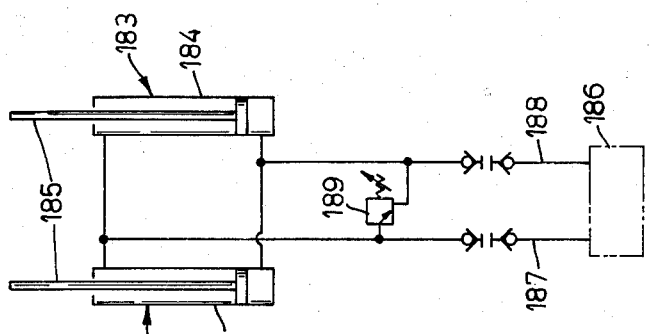
FIG. 22 is a schematic view of the hydraulic control system for the gate structure of the machine.

The hydraulic cylinders 182 and 183 which are associated with the right and left sides of the machine, respectively, are simultaneously operated by hydraulic means which includes the circuit shown in FIG. 22. Conventional tractors which are used for towing the baling machine 10 are equipped with a hydraulic system and control mechanism indicated generally at 186. The characteristics of such controls are that they are operated to deliver hydraulic fluid under pressure to a line 187 and receive exhausted fluid through another line 188 or they are operated to supply fluid to the line 188 and receive exhausted fluid from the line 187. In a neutral position of the control mechanism 186, the tractor hydraulic system is isolated from both of the lines 187 and 188. In such a neutral position, hydraulic fluid remaining in the lines 187 and 188 and the associated hydraulic components of the baling machine 10 are maintained separate from the tractor. As seen in FIG. 22, the lower ends of the cylinder 182 and 183 are connected to the line 188, and the upper ends of cylinders are commonly connected to the line 187. By manipulation of the control mechanism 186 associated with the tractor hydraulic system, hydraulic fluid under pressure can be delivered to the line 188 and the cylinder assemblies 182 and 183 will be simultaneously extended so that the piston rods 185 move upwardly as seen in FIG. 22. At the same time hydraulic fluid is discharged from the upper end of the cylinder assemblies to the line 187 and back to the tractor hydraulic control system 186. Such operation is effective to open the gate structure 20 by swinging it relative to the body 12. Delivery of hyraulic fluid pressure to the line 187 is effective to retract the piston rods 185 so that they move downwardly, and at the same time fluid is exhausted through the lines 188 back to the tractor control system 186, causing closing of the gate structure 20.

When the hydraulic cylinders 182 and 183 are not being operated to open or close the gate structure 20, the tractor control 184 is maintained in a neutral position and hydraulic fluid remains trapped in the lines 187 and 188 and in the associated portions of the cylinders 182 and 183. An adjustable directional pressure relief valve 189 is connected between the lines 187 and 188 on the baling machine 10. During the bale forming operation, as the bale is enlarging and moving the gate structure 20 toward an open position, hydraulic fluid is forced from the upper ends of the cylinders 182 and 183 to the lines 187 and through the valve 189 to the line 188 and back to the lower end of the hydraulic cylinders 182 and 183. By adjusting the valve 189, the resistance to hydraulic fluid flow and, therefore, to movement of the rods 185 of the assemblies 182 and 183 can be controlled. This makes it possible for the operator to select the degree of resistance to hydraulic fluid flow and, consequently, to the opening movement of the gate structure 20. As a result the resistance to extension of the cylinder assemblies is transmitted through the gate structure 20 and the belts 29 to control the amount of pressure being applied by the belt flights 115 and to the outer circumference of the bale. In this manner, the hydraulic cylinders 182 and 183 together with the spring assemblies 135 are used to compact the bale and regulate its density.

DRIVE MECHANISM

As best seen in FIG. 8, the various belts and rollers of the machine are powered for movement from the drive mechanism 16 seen in FIG. 2 which is connected to the power take-off connection of a tractor. The drive shaft 16 delivers rotational power to a double sprocket 190 which, as viewed in FIG. 8, is mounted at the left side of the machine to turn in a clockwise direction. The conveyor belt assembly 26 is powered by chain 191 which passes from the double sprocket 190 over idler sprocket 192 and a double sprocket 193 to a sprocket 194 fixed on the shaft of the driving roller 34 seen in FIG. 8. The roller 34 and sprocket 194 are rotated in a clockwise direction to move the upper flight of the belt 40 rearwardly toward the tensioning roller 42. The sprocket 193 is a double sprocket arrangement which is caused to rotate by the chain 191 and to deliver rotational power by means of a chain 196 to a sprocket 197 fixed to one end of the axle of the packer roller 31. The double sprocket 193 rotates on the same axis as the pivot 147 for the packer roller 31 as seen in FIG. 21, so that rotational power is delivered to the sprocket 197 and to the roller 31 for all vertical positions of the latter.

The upper belts 29 are driven from the double driving sprocket 190 by means of a chain 198 passing over an idler sprocket 199 to deliver rotational power to a double sprocket 201 which is mounted on the axle of the material confining roller 110 as can be seen in FIG. 3. The rollers 111 and 113 are also provided with drive sprockets 202 and 203, respectively. A chain 204 passes from the double sprocket 201 over an idler sprocket 205 to the drive sprockets 202 and 203 and back to the double sprocket 201. Delivery of rotational power to the double sprocket 190 therefore causes movement of the conveyor belt 40 and the upper plurality of belts 29 and serves to rotate the packer roller 31.

It will be noted that the drive arrangement made up of the various sprockets and chains is separated from the bale forming chamber by the inner panel of the wall 21 which is free of any openings. The panel serves to keep lost hay out of the drive mechanism which might otherwise interfer with or jam the mechanism.

OPERATION

A baling operation is begun with the various components of the baling machine 10 in the relative position shown in FIG. 3. The baling machine 10 is towed by a tractor longitudinally of windrowed crop, such as hay, and the tractor may be steered transversely of the windrow from one side or the other to insure that the hay is delivered uniformly by the rotary rake 18 to all transverse portions of space between the conveyor belt 40 and the packer roller 31. The packer roller 31 serves to compact the cut crop material into a relatively thin mass which passes rearwardly along the upper surface of the belt 40 toward the material confining roller 92 over which the upper belts 29 pass. Further rearward movement of the crop material is obstructed by the close spacing of the material confining roller 92 and the upper surface of the conveyor belt 40. As the cut crop material is engaged by the oppositely moving belts 29, the crop material is tumbled and rotated in a generally counterclockwise direction within the core forming chamber designated at 32.

The core forming chamber 32 can be generally defined by the flight portion 115 of the belts 29 passing between the material confining rollers 92 and 110 and the upper flight of the belt 40 disposed immediately below the belt flight 115. The forward portion of the core forming chamber 32 is defined by the fingers 162 of the starter assembly 160. As a consequence the core chamber 32 is initially of generally triangular shape in cross section and is disposed to the rear and in spaced relation to the packer roller 31. The ends of the core or bale forming chamber 32 are defined by the inner sheet metal panels of the walls 21 and 22.

As the core progressively increases in diameter in its initial stage to the size indicated in FIG. 4, it is prevented from leaving the core forming chamber 32 by the fingers 162. As the cut crop material continues to be fed under the packer roller 31 to the bale forming zone 32, the core continues to grow in size to form a bale. As the diameter of the bale increases, the flights 115 of the belts 29 passing between the rollers 92 and 110 are deflected upwardly. The continued growth of the bale eventually deflects the flight portions 115 of the belts 29 until they engage the guide roller 172 associated with the starter assembly 160. The guide roller 172 continues to engage the inner surfaces of the belts 29 and the starter assembly 160 is moved upwardly and rearwardly between the spaced belts 29 and the lower ends of the fingers 162 are disposed in approximately the same horizontal plane as the axis of rotation of the material confining roller 110. During the initial lifting of the starter assembly 160, the lower ends of the fingers 162 are moved from a position behind the packer roller 31 as seen in FIG. 3, upwardly and rearwardly, toward the position indicated in FIG. 4 and thereafter to the position in FIG. 5. Such movement of the fingers 162 is accomplished by the spacing between the link pivots 166 and 168 which is greater than the spacing between the pivots 169 and 170. The links 165 and 167 which have substantially the same effective lengths between their respective pivots, serve to guide the lower ends of the fingers 162 so that they initially move upwardly and rearwardly away from the packer roll 31. The fingers 162 engage the surface of the enlarging bale 180 and move it away from the packer roller 32 toward the position shown in FIG. 5 so that the oppositely moving surfaces of the bale 180 and packer roller 31 do not interfere with each other. The partially formed bale will thereafter be confined between the material confining roller 110 and the material confining roller 92 and will continue to be maintained in rearwardly spaced relationship to the packer roller 31. Thereafter, the bale forming zone between the walls 21 and 22 is defined by the conveyor belt 40 and the belt flights 115 between the material confining rollers 92 and 110 and the starter assembly 160 is moved upwardly and forwardly to an inoperative position by the guide roller 172 until it ultimately reaches the position shown in FIG. 6.

The ever growing bale continues to be confined between the conveyor belt 40 and the oppositely moving belts 29 between the material confining rollers 92 and 110 and the bale is rotated in a counterclockwise direction as viewed in FIGS. 3 through 6 and in spaced relationship to the packer roller 31 which is rotating in the same direction. It will be observed that, if the packer roller 31 were to contact the rotating bale, there would be resistance to rotation of the packer roller 31 and the bale relative to each other which could cause crop material to be removed from the bale and to be wrapped around the packer roller 31 which ultimately could obstruct the material receiving cavity formed between the packer roller 31 and the conveyor belt 40.

Figure 5:
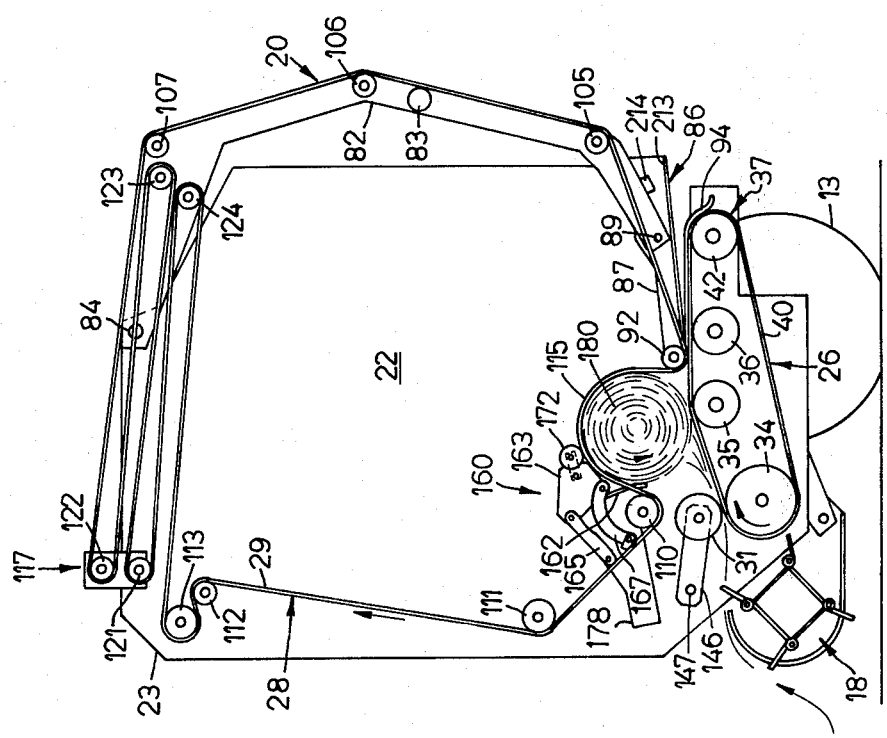
FIG. 5 is a view similar to FIG. 4 showing the relative position of the parts, particularly when the bale starting mechanism has moved to an inoperative position.

As the bale continues to grow, the belts 29 passing between the two material confining rollers 92 and 110 are deflected upwardly and remain in contact with the upper peripheral surface of the bale 180. The deflection of these belt surfaces causes the shuttle mechanism 117 to move to the right or to the rear of the machine from the position shown in FIG. 3 to the position shown in FIG. 6 during which time it moves substantially horizontally at the top portion of the baler machine body 12, leaving the bale storage chamber, as seen in FIG. 5, unobstructed so that the operator can view the bale which is being formed. The horizontal movement of the shuttle mechanism 117 is resisted by the chains 131 and the spring assemblies 135 which, as seen in FIGS. 8 and 9, tend to urge the shuttle mechanism 117 to a forward position on the baling machine 10. The effect of the spring load of the spring assemblies 135 on the shuttle mechanism 117 which is transmitted to the belts 29 and to the belt flight 115, is to tightly pack the bale 180 which is being formed so that a uniform bale density and compactness is achieved.

When the bale which is being formed has achieved the size illustrated in FIG. 5, it will be noted that the outer surface of the bale has approached the material confining roll 92 and that the axis of rotation of the bale has moved rearwardly within the bale forming chamber. As the bale continues to grow from this condition, the material confining roller 92 is urged rearwardly and horizontally by the action of the belts 29 and such movement is transmitted through the gate extension 86 to the gate 20 urging the latter to pivot about the axis through the pivot points 84 at opposite sides of the body 12. Pivotal movement of the gate 20, however, is resisted by the pair of hydraulic cylinders 182 and 183 which, as seen in FIGS. 8 and 9, are similarly disposed at opposite sides of the machine on the outer sides of the walls 21 and 22. As the gate 20 tends to pivot, hydraulic fluid in the upper part of each of the cylinders 182 and 183 is forced into the hydraulic circuit shown in FIG. 22 and through the valve 189 to the lower ends of the cylinders. By adjusting the control valve 188 to resist hydraulic flow, pivotal movement of the gate 20 toward an open position is resisted. Such resistance to the opening of the gate 20 assists the spring assemblies 135 in resisting deflection of the belts 29 passing between the material confining rollers 92 and 110 and applies tension to the outside surface of the bale which is being formed.

As the bale is increasing in size from the condition shown in FIG. 5, the material confining roller moves rearwardly in uniformly and closely spaced relation to the conveyor belt 40 so that escape of cut crop material through the rear of the machine is prevented and the material is diverted into the bale being formed.

Referring now to FIG. 6, when the bale being formed approaches the indicated size, the material confining roller 92 will have been moved toward the rear of the conveyor belt assembly 26. As seen in FIG. 15, the gate extension 86 will be guided by the cam guides 93 to follow the guide surfaces 94 so that the cams 93 will move to the position indicated at 210 and thereafter, generally downwardly to the position indicated at 211 to follow the curved portion of the guide surface 94 which serves to maintain a closed space relationship to the belt 40 as it passes over the roller 42. This relationship is maintained as the roller 42 is biased to accommodate the resiliency of the belt 40 to maintain it tight since the roller 42 and guide surfaces 94 move as a unit with the tensioning roller assembly 37.

When the cams 93 reach the position indicated at 211, a flange portion 213 at the rearward portion of the arms 87 will come into engagement with a stop member 214 as seen in FIG. 6 to limit further downward movement of the material confining roller 92. Continued opening movement of the gate structure 20 will cause the material confining roller 92 to be spaced from the upper surface of the conveyor belt 40 as it passes over the roller 42. As a consequence of this spacing, any additional cut crop which is fed to the baling machine 10 will not be wrapped around the bale, and instead, the cut crop material will be discharged between the roller 92 and the belt 40 to the rear of the machine as illustrated in FIG. 6. At this point the bale 180 has reached its maximum size and the operator will stop the forward movement of the baling machine 10.

Upon completion of the bale, rotation of the conveyor 40 and the belts 29 is continued while a twine binding operation is conducted. Although this operation is not shown, it consists of feeding twine from a storage magazine to pass around the completed bale. As the bale continues to rotate the twine is moved transversely of the bale to keep the twine evenly distributed. The twine serves to keep the bale confined and compacted and to reduce its tendency to unravel.

Figure 7:
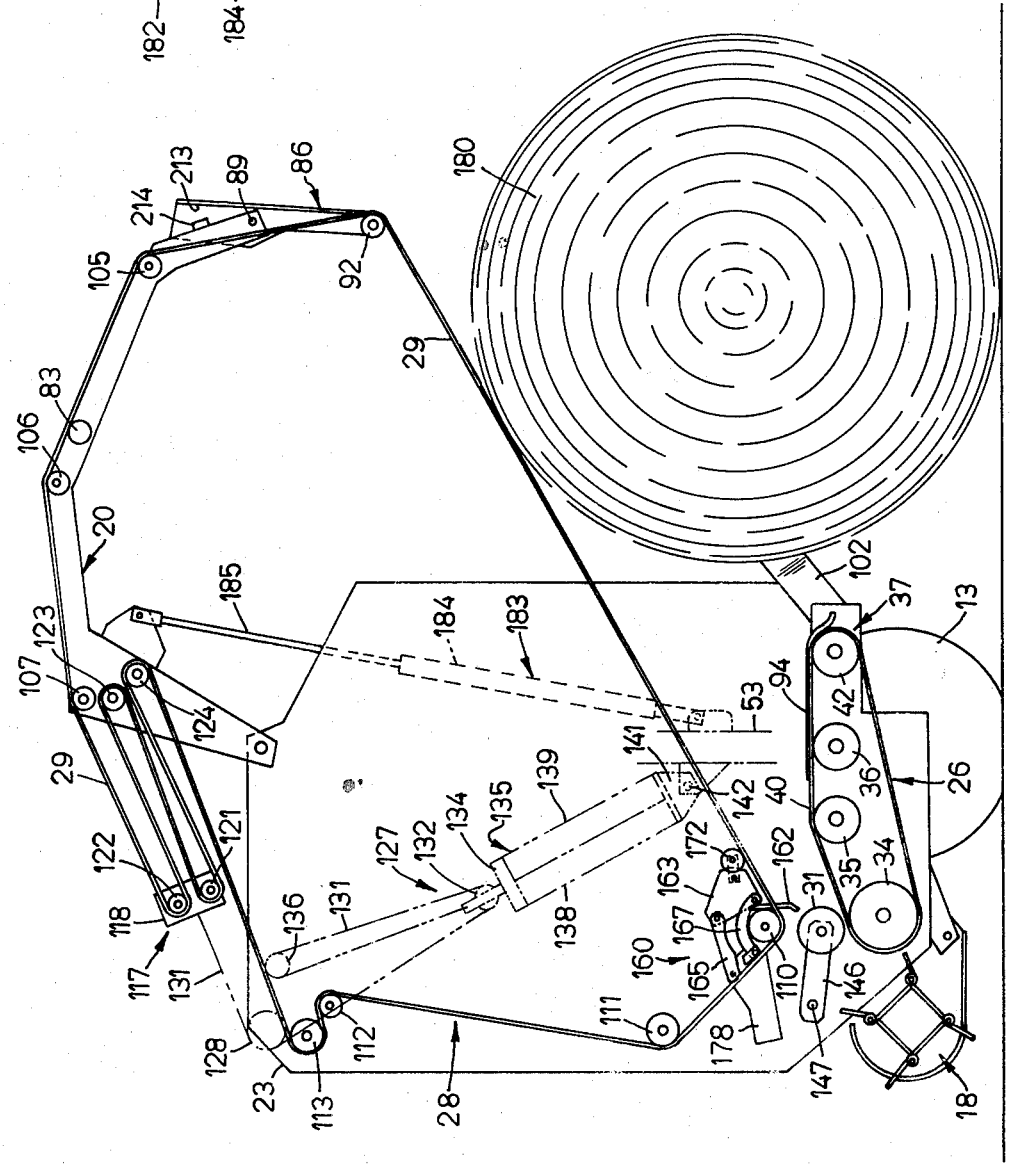
FIG. 7 is a view similar to FIG. 6 but showing the relative position of the parts upon removal of the completed bale from the machine.

After the bale has been wound with twine, movement of the conveyor belt 40 and the compacting belt 29 can be stopped and the rear gate 20 can be pivoted to a generally counterclockwise direction around the gate pivots 84 by means of the hydraulic cylinders 182 and 183 to the position in which the gate 20 is shown in FIG. 7. Subsequent operation of the conveyor belt 40 serves to move the completed bale rearwardly for discharge through the open end of the baler body 12 to a position on the ground. Discharge of the bale from the machine 10 can take place at the location where it has been completed or the finished bale may be moved to a chosen site using the machine 10 as the transporting means for discharge of the bale at the storage site.

After the bale has been discharged from the machine 10, the gate 20 is permitted to pivot in a clockwise direction toward a closed position under the urging of spring mechanism 127 and the shuttle mechanism 117 together with the operation of the hydraulic cylinders 182 and 183. As the gate 20 approaches its closed position, as seen in FIG. 11, the roller 92 on the gate extension 86 approaches the pair of wing guides 102 seen in FIGS. 8 and 9 and which are disposed at opposite sides of the path of the moving roller 92. The rearward edges of the wings are spaced transversely a greater distance than the forward edges which are aligned with the wall portions 96 between the guide surfaces 94 and 95. As the gate 20 approaches closed position the cam guides 93 at opposite sides of the gate extension 86 pass between the wings. In the event that there is any distortion of the gate 20 when the latter moves from its open to closed position, the wings serve to engage the cams 93 and guide shoes 103 to shift the roller 92 and the gate structure 20 laterally to an aligned position. Referring now to FIG. 15, as the cams 93 approach the rearward end of the guide surface 94 the cams 93 are guided generally upwardly and forwardly above the roller 42 after which the cams 93 guide the roller 92 generally horizontally and forwardly to the position in which the roller 92 is indicated in FIG. 3.

After the gate 20 has been moved to its fully closed position as indicated in FIG. 3, the baling machine 10 may be towed to an appropriate location for initiating another baling operation.

It will be seen that a baling machine has been provided for making cylindrical bales in which the bale is formed efficiently without rotating parts such as a packing or starting roller interfering with the bale which is being rotated during its formation and in which all of the hay which is received by the baling machine is introduced to and made part of the bale without any spillage or waste until the maximum size of the bale is achieved and in which an endless, spliceless belt is employed to minimize the requirement for service and repair, and which may be installed and removed in an efficient manner. Moreover, all of the mechanisms of the baling machine are so arranged that the operator is afforded maximum visibility of the bale which is being formed making it possible to properly control and operate the baling machine to make a compact bale of uniform cross section and density.

We claim:

1. A machine for forming a cylindrical bale of cut crop material comprising: a mobile frame, a conveyor belt movably supported on said frame and including an upper belt flight movable rearwardly relative to said frame, means on said frame for picking up and delivering material to be baled to said conveyor belt, a packer roller extending transversely and in close proximity to a forward portion of said upper belt flight for feeding material therebetween, a first roller disposed in parallel relation to said packer roller and above the latter for rotation about an axis stationary to said frame, a second roller extending transversely and in close proximity to an intermediate portion of said upper belt flight, belt means movably supported on said frame and being guided by said first and second rollers to form a lower belt flight therebetween, means for simultaneously moving said upper and lower belt flights in opposite directions for rotating crop material therebetween to form a rotating cylindrical bale with its bottom surface portion moving rearwardly, means yieldably resisting extension of said lower belt flight and maintaining the latter in contact with the surface of the bale being formed, and means for maintaining the bale in rearwardly spaced relation with respect to and out of contact with said packer roller during formation of the bale, wherein the means for maintaining the bale in rearwardly spaced relation includes members movable rearwardly and upwardly during the initial stage of formation of the bale.

2. The combination of claim 1 in which said second roller is supported for movement horizontally and rearwardly relative to said first roller as the bale is being formed.

3. The combination set forth in claim 1 wherein said lower belt flight of said belt means includes a plurality of belts moving in parallel spaced paths, wherein said members comprise a plurality of transversely spaced fingers depending between said paths, and wherein means are provided for supporting said fingers for simultaneous movement in response to formation of said bale from a bale starting position spaced rearwardly of said packer roller and first roller to a bale completed position above said first roller and below the center of the completed bale.

4. The combination set forth in claim 3 in which said upper belt flight, lower belt flight, and said fingers form a transversely extending bale starting chamber, and in which said upper and lower belt flights form a bale forming chamber after said fingers have moved from a position above said lower flight and out of said bale starting chamber.

5. A crop handling machine for forming a cylindrical bale of cut crop material comprising: a mobile frame including a forward body portion having a pair of vertically extending wall members at opposite sides of said frame, a conveyor belt having an upper belt flight movable rearwardly relative to said frame and being disposed between said wall members, means for receiving cut crop and delivering it to said conveyor belt, a rearward body portion pivoted to the upper portion of said wall members for swinging movement between closed and open positions, a first material confining roller disposed transversely of said conveyor belt for rotation about a stationary axis on said forward body portion, a second material confining roller disposed in close proximity to said conveyor belt and being supported by said rearward body portion for rotation about an axis parallel to the axis of rotation of said first roller, belt means movably supported on said frame and being guided by said first and second rollers to form a lower belt flight therebetween, means for simultaneously moving said upper and lower belt flights in opposite directions for rotating crop material therebetween to form a cylindrical bale, a plurality of rollers supported for rotation on said forward body portion and on said rearward body portion, and shuttle means including at least one roller extending transversely of said frame and supported for generally horizontal movement at the top of one of said body portions, said belt means being trained from a pair of said plurality of rollers on the other of said body portions to said shuttle roller, said shuttle roller being movable horizontally in response to deflection of said lower belt flight during formation of the bale.

6. The combination set forth in claim 5 and further comprising means yieldably resisting movement of said shuttle roller.

7. The combination set forth in claim 5 in which said second material confining roller is movable rearwardly in response to formation of the bale and in which said rearward body portion is pivoted toward an open position in response to rearward movement of said second material confining roller.

8. The combination set forth in claim 7 and further comprising additional means for yieldably resisting movement of said rearward body portion to its open position.

9. The combination set forth in claim 5 in which said pair of said plurality of rolls is supported transversely of said frame at an upper portion of said other of said body portions.

10. The combination set forth in claim 6 in which said means for resisting movement of said shuttle roll includes spring biasing means disposed at opposite sides of said frame and operatively connected to opposite ends of said shuttle means for continuously resisting movement of said shuttle roll towards said other of said body members.

11. The combination set forth in claim 10 and further comprising a pair of link chains at opposite sides of said frame, each of said chains having opposite ends connected to opposite ends of said shuttle means, respectively, and to said spring biasing means, respectively, and a pair of sprockets rotatably supported at an upper portion of said one of said body portions and receiving an intermediate portion of each of said chains, said sprockets being interconnected for rotation as a unit on movement of said shuttle means.

12. A crop handling machine for forming a cylindrical bale comprising: a mobile frame including a pair of parallel vertically extending wall members at opposite sides of said frame, a conveyor belt having a portion movable rearwardly relative to said frame and being disposed between said wall members, means for receiving cut crop and delivering it to said conveyor belt, a gate structure pivoted to the upper portion of said frame member for swinging movement between closed and open positions, a first material confining roll disposed transversely above a forward portion of said belt to rotate about a stationary axis relative to said frame, a second material confining roll disposed in close proximity to said conveyor belt and being supported by said gate structure for rotation about an axis parallel to the axis of rotation of said first material confining roll, a plurality of rolls supported for rotation on a forward portion of said frame and on a rearward portion of said gate structure, a plurality of transversely spaced belts passing below said first and second material confining rolls and over said plurality of rolls on said frame and said gate structure to form a bale chamber between said conveyor belt and portions of said belts passing between said first and second material confining rollers, said second material confining roll being movable horizontally rearwardly as said bale increases in size to urge said gate towards an open position to enlarge the capacity of said bale chamber, said frame including guide means for receiving the ends of said second material confining roll, said guide means including an upper guide surface for preventing upward vertical movement of said second material confining roll and for maintaining said roll in uniformly spaced relation to said conveyor belt as said second material confining roll moves rearwardly.

13. The combination of claim 12 in which said guide means maintains said second material confining roll in uniformly spaced relationship to said conveyor belt until said material confining roll is moved to the rearward portion of said conveyor belt, said gate structure being movable in response to enlargement of the bale to move said material confining roller from said guide means to a spaced relation from said conveyor belt to permit escape of material from said bale chamber to limit capacity thereof.

14. The combination of claim 12 in which said guide means are adjustable to vary the spacing between said second material confining roller and said conveyor belt.

15. A machine for forming cylindrical bales of cut crop material comprising, a mobile frame having a pair of opposed vertical walls; roller assemblies including a pair of end rollers and an intermediate roller located between the rollers of said pair of rollers, said rollers disposed transversely of said frame and having ends mounted in operative positions in said walls for rotatably mounting said assemblies; a one piece, endless and spliceless conveyor belt trained around said assemblies and movable thereon, each of said walls forming slots and roller assembly removal openings, said slots extending from said operative positions in said walls to said removal openings, and means for detachably securing said assemblies to said walls in said operative positions, whereby said roller assemblies can be moved in said slots to said removal openings and out of said removal openings to free said one piece belt for removal, the slots and openings for said intermediate roller being of closed configuration with respect to their outer limits whereby removal of said intermediate roller is in a direction parallel to its axis and laterally out through one of said vertical walls.

16. The combination of claim 15 and further comprising an additional roller assembly, and bracket means on said frame for supporting said additional roller assembly rearwardly of said walls, said belt being trained over said additional roller assembly, said bracket means being removable for removal of said additional roller assembly from within said endless belt.

17. The combination of claim 15 in which each of said roller assemblies includes a belt supporting structure disposed between said walls, and axle portions projecting from opposite ends of said roller assemblies and through adjacent walls.

18. The combination of claim 17 in which said means for detachably securing said roller assemblies includes a bearing member for each axle portion, and in which said bearing members are detachably connected to said walls.

19. In a machine for forming a cylindrical bale, a frame including a pair of vertically disposed walls at opposite sides thereof, an endless and spliceless conveyor belt movably supported between said walls for conveying crop material therebetween, each of said walls having perimeter portions, first and second roller assemblies having portions disposed between said walls and being supported for rotation about axes extending transversely of said frame and spaced from said perimeter portions of said walls, a third roller assembly rotatable about an axis spaced from said walls and parallel to said axes of said first and second roller assemblies, bracket means detachably supporting said third roller assembly at opposite ends to said wall portions, said conveyor belt being supported for movement by said first, second and third roller assemblies, a roll containing compartment formed by said belt, said wall portions and said bracket means and containing said first, second and third roller assemblies, said walls each forming a slot extending generally from the intersection of each axis of said first and second roller assemblies to the perimeter of the respective wall, said first and second roller assemblies having axle portions extending from opposite ends of said first and second roller assemblies and disposed within said slots, said bracket means being removable from said frame to expose the side of said roll containing compartment, and bearing means rotatably supporting said axle portions at the intersection of said axes, said first and second roller assemblies being movable with the respective axles in said slots beyond a perimeter portion of said walls upon removal of said bearing means, at least one of said roller assemblies being removable from the exposed side of said roll containing compartment.

20. The combination set forth in claim 19 in which the slots associated with each of said axles of one of said first or second roller assemblies define paths in said wall extending parallel to each other.

21. A machine for forming a cylindrical bale of cut crop material comprising: a mobile frame, a conveyor belt movably supported on said frame and including an upper belt flight movable rearwardly relative to said frame, means on said frame for picking up and delivering material to be baled to said conveyor belt, a packer roller extending transversely and in close proximity to a forward portion of said upper belt flight for feeding material therebetween, a first roller disposed in parallel relation to said packer roller and above the latter for roation about an axis stationary to said frame, a second roller extending transversely and in close proximity to an intermediate portion of said upper belt flight, belt means movably supported on said frame and being guided by said first and second rollers to form a lower belt flight therebetween, means for simultaneously moving said upper and lower belt flights in opposite directions for rotating crop material therebetween to form a rotating cylindrical bale with its bottom surface portion moving rearwardly, and means yieldably resisting extension of said lower belt flight and maintaining the latter in contact with the surface of the bale being formed, said first roller maintaining the bale in rearwardly spaced relation to said packing roller during formation of the bale, said lower belt flight of said belt means including a plurality of belts moving in parallel spaced paths, and further comprising a finger assembly including a plurality of transversely spaced fingers depending between said path, and means supporting said fingers for simultaneous movement in response to formation of said bale from a bale starting position spaced rearwardly of said packer roller and first roller to a bale completed position above said first roller and below the center of the completed bale, and wherein said means for supporting said fingers includes links pivoted to said frame and to said finger assembly, said finger assembly including a guide means engageable with said lower belt flight for moving said fingers toward said bale completed position, said guide means being initially spaced from said lower belt flight to maintain said fingers in a bale starting position until the upper part of said bale enlarges to move said lower belt flight into engagement with said guide means.

22. The combination set forth in claim 21 and further comprising biasing means resisting movement of said finger assembly from said bale starting position.

23. A crop handling machine for forming a cylindrical bale comprising: a mobile frame including a pair of parallel vertically extending wall members at opposite sides of said frame, a conveyor belt having a portion movable rearwardly relative to said frame and being disposed between said wall members, means for receiving cut crop and delivering it to said conveyor belt, a gate structure pivoted to the upper portion of said frame member for swinging movement between closed and open positions, a first material confining roll disposed transversely above a forward portion of said belt to rotate about a stationary axis relative to said frame, a second material confining roll disposed in close proximity to said conveyor belt and being supported by said gate structure for rotation about an axis parallel to the axis of rotation of said first material confining roll, a plurality of rolls supported for rotation on a forward portion of said frame and on a rearward portion of said gate structure, a plurality of transversely spaced belts passing below said first and second material confining rolls and over said plurality of rolls on said frame and said gate structure to form a bale chamber between said conveyor belt and portions of said belts passing between said first and second material confining rollers, said second material confining roll being movable horizontally rearwardly as said bale increases in size to urge said gate towards an open position to enlarge the capacity of said bale chamber, and guide means associated with said frame and said second material confining roll for maintaining the latter in uniformly spaced relation to said conveyor belt as said second material confining roll moves rearwardly, and wherein said gate structure includes a main gate structure and an auxiliary gate structure connected together for relative pivotal movement about a generally transverse axis and in which said second material confining roll is supported on said auxiliary gate structure for horizontal movement rearwardly during relative movement of said main and auxiliary gate structures.

24. The combination of claim 23 and further comprising means for yieldably resisting movement of said gate structures relative to said frame.

25. The combination of claim 24 in which said means for yieldably resisting movement are selectively adjustable to select the magnitude of resistance of relative movement of said main and auxiliary gate structures.

* * * * *